US012776489B2

(12) United States Patent
Kwon et al.

(10) Patent No.: US 12,776,489 B2
(45) Date of Patent: Oct. 27, 2026

(54) ELECTRODE, LITHIUM BATTERY INCLUDING THE SAME, AND METHOD OF MANUFACTURING THE ELECTRODE

(71) Applicant: Samsung SDI Co., Ltd., Yongin-si (KR)

(72) Inventors: Ilkyong Kwon, Yongin-si (KR); Hyun Nam, Yongin-si (KR); Yeonhee Yoon, Yongin-si (KR); Donggeun Lee, Yongin-si (KR); Jinhyon Lee, Yongin-si (KR); Ahram Pyun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 745 days.

(21) Appl. No.: 18/065,892

(22) Filed: Dec. 14, 2022

(65) Prior Publication Data

US 2023/0187637 A1 Jun. 15, 2023

(30) Foreign Application Priority Data

Dec. 14, 2021 (KR) ........................ 10-2021-0178877

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0435* (2013.01); *H01M 4/133* (2013.01);
(Continued)

(58) Field of Classification Search
CPC .... H01M 4/583; H01M 4/0435; H01M 4/133; H01M 4/1393; H01M 4/623; H01M 4/661
See application file for complete search history.

(56) References Cited

U.S. PATENT DOCUMENTS 8,663,846 B2 3/2014 Choi et al.
9,219,271 B2 * 12/2015 Kolosnitsyn .......... H01M 4/382
(Continued)

FOREIGN PATENT DOCUMENTS

CN 101752545 A 6/2010
CN 103259002 A 8/2013
(Continued)

OTHER PUBLICATIONS

Machine Translation of KR-20160063911-A (May 28, 2026) (Year: 2026).*
(Continued)

*Primary Examiner* — Matthew J Merkling

(74) *Attorney, Agent, or Firm* — Womble Bond Dickinson (US) LLP

(57) ABSTRACT

An electrode, a lithium battery including the same, and a method of manufacturing the electrode. The electrode includes an electrode current collector, and an electrode active material layer on at least one surface of the electrode current collector, wherein the electrode active material layer includes a first electrode active material, a second electrode active material, and a binder, the electrode active material layer includes a first cluster, and the first cluster is an agglomerate including a plurality of first electrode active materials, one surface of the electrode active material layer includes a first domain including the first cluster, and an area of the first domain is about 15% to about 60% of the total area of the one surface of the electrode active material layer.

18 Claims, 19 Drawing Sheets

(51) Int. Cl.

| | |
|---|---|
| ***H01M 4/133*** | (2010.01) |
| ***H01M 4/1393*** | (2010.01) |
| ***H01M 4/62*** | (2006.01) |
| ***H01M 4/66*** | (2006.01) |

(52) U.S. Cl.

CPC ......... *H01M 4/1393* (2013.01); *H01M 4/623* (2013.01); *H01M 4/661* (2013.01)

(56) References Cited

U.S. PATENT DOCUMENTS

| | | | | |
|---|---|---|---|---|
| 2010/0209763 | A1 | 8/2010 | Okamura et al. | |
| 2011/0052995 | A1 | 3/2011 | Sano et al. | |
| 2012/0121991 | A1* | 5/2012 | Tikhonov ............ | H01M 10/052 429/199 |
| 2012/0202114 | A1* | 8/2012 | Madray ............... | H01M 4/0435 264/105 |
| 2015/0061176 | A1 | 3/2015 | Bruckner et al. | |
| 2016/0149205 | A1* | 5/2016 | Theivanayagam . | H01M 4/0435 429/221 |
| 2018/0145373 | A1* | 5/2018 | Han ........................ | H01M 4/70 |
| 2019/0088935 | A1 | 3/2019 | Kachi | |
| 2019/0237748 | A1 | 8/2019 | Shin et al. | |
| 2019/0280303 | A1* | 9/2019 | Torita ................ | H01M 10/0525 |
| 2020/0006758 | A1 | 1/2020 | Wi et al. | |
| 2020/0212442 | A1 | 7/2020 | Watanabe et al. | |
| 2020/0259180 | A1 | 8/2020 | Shin et al. | |
| 2020/0388830 | A1 | 12/2020 | Lee et al. | |
| 2021/0098770 | A1 | 4/2021 | Yudi et al. | |
| 2022/0393311 | A1* | 12/2022 | Liu ..................... | H01M 50/434 |
| 2023/0027323 | A1* | 1/2023 | Xu ...................... | H01M 4/0435 |

FOREIGN PATENT DOCUMENTS

| | | | | | |
|---|---|---|---|---|---|
| CN | 103762363 | A | | 4/2014 | |
| CN | 103891015 | A | | 6/2014 | |
| CN | 109071266 | A | | 12/2018 | |
| JP | 2000-82466 | A | | 3/2000 | |
| JP | 2009-283354 | A | | 12/2009 | |
| KR | 2006-0091486 | A | | 8/2006 | |
| KR | 20160063911 | A | * | 6/2016 | .......... H01M 10/052 |
| KR | 2019-0093453 | A | | 8/2019 | |
| KR | 2020-0001230 | A | | 1/2020 | |

OTHER PUBLICATIONS

Extended European Search Report, Corresponding Application No. EP 22213445.4, dated May 10, 2023, 10 pp.

Japan Office Action, Corresponding Application No. 2022-199444, issued on Jan. 22, 2024, 2 pages.

Chinese Office Action dated Apr. 14, 2025, issued in corresponding Chinese Patent Application No. 202211607792.X, 11 pages.

Office Action, corresponding to European Application No. 22213445.4, dated Jul. 14, 2026, 6 pages.

* cited by examiner

ELECTRODE, LITHIUM BATTERY INCLUDING THE SAME, AND METHOD OF MANUFACTURING THE ELECTRODE

CROSS-REFERENCE TO RELATED APPLICATION

This application claims priority to and the benefit of Korean Patent Application No. 10-2021-0178877, filed on Dec. 14, 2021, in the Korean Intellectual Property Office, the disclosure of which is incorporated by reference herein in its entirety.

BACKGROUND

1. Field

Embodiments of the present disclosure described herein are related to an electrode, a lithium battery including the same, and a method of manufacturing the electrode.

2. Description of the Related Art

In order to meet the miniaturization and high performance of one or more suitable devices, lithium batteries need to have high energy density in addition to miniaturization and weight reduction. As such, high-capacity lithium batteries are becoming more important.

In order to implement lithium batteries suitable for the above uses, electrodes having high loading is being studied.

In an electrode with high loading, the distribution of constituents in the electrode becomes substantially non-uniform and the density near the surface of the electrode is increased. Accordingly, the performance of a lithium battery including such an electrode is deteriorated.

In view of at least the forgoing, an electrode capable of preventing or reducing the deterioration of lithium battery performance is desired or may even be required.

SUMMARY

Aspects of embodiments of the present disclosure are directed toward a novel electrode of which electrolyte impregnation characteristics are improved by including a cluster, which is an aggregate of electrode active material, in an electrode.

Aspects of embodiments of the present disclosure are directed toward a novel electrode that prevents deterioration of battery performance in which components in the electrode have a substantially uniform distribution.

Aspects of embodiments of the present disclosure are directed toward a lithium battery including the electrode.

Aspects of embodiments of the present disclosure are directed toward a method of preparing the electrode.

Additional aspects will be set forth in part in the description which follows and, in part, will be apparent from the description, or may be learned by practice of the presented embodiments of the disclosure.

According to one or more embodiments, an electrode includes an electrode current collector, and an electrode active material layer on one or both (e.g., opposite) surfaces of the electrode current collector, wherein the electrode active material layer includes a first electrode active material, a second electrode active material, and a binder, the electrode active material layer includes a first cluster, wherein the first cluster is an agglomerate including a plurality of first electrode active materials, one surface of the electrode active material layer includes a first domain including the first cluster, and an area of the first domain is about 15% to about 60% of the total area of the one surface of the electrode active material layer.

According to one or more embodiments, a lithium battery includes a cathode, an anode, and an electrolyte located between the cathode and the anode, wherein one of the cathode and the anode is the electrode described above.

According to one or more embodiments, a method of manufacturing an electrode, the method including: preparing a dry mixture by dry mixing a first electrode active material, a second electrode active material, a dry conductive material, and a dry binder, forming an electrode active material layer from the dry mixture, roll-pressing the electrode active material layer, and placing a roll-pressed electrode active material layer on an electrode current collector, wherein the electrode includes an electrode current collector, and an electrode active material layer disposed on one or both (e.g., simultaneously) surfaces of the electrode current collector, wherein the electrode active material layer includes a first electrode active material, a second electrode active material, and a binder, the electrode active material layer includes a first cluster, wherein the first cluster is an agglomerate including a plurality of first electrode active materials, one surface of the electrode active material layer includes a first domain including the first cluster, and an area of the first domain is about 15% to about 60% of the total area of the one surface of the electrode active material layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
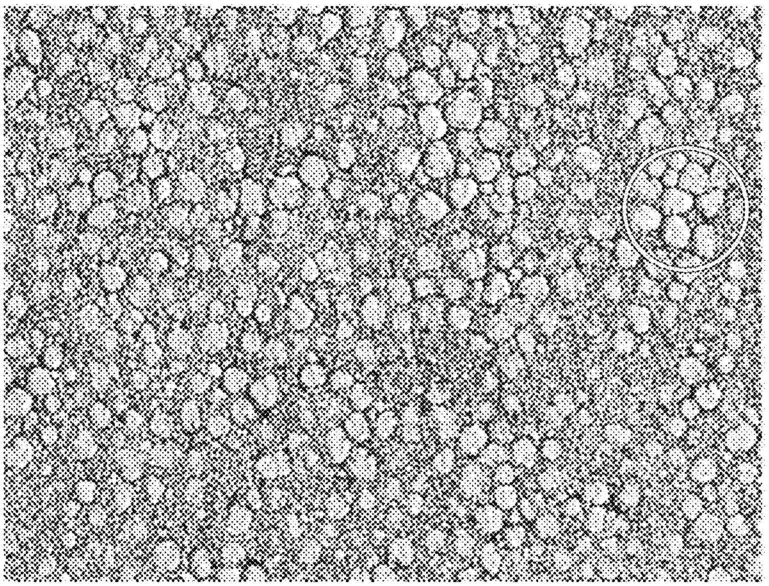
FIG. 1 shows a scanning electron microscope image of one surface of an electrode active material layer included in an electrode prepared in Example 1 according to an embodiment.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described, by referring to the drawings, to explain aspects of the present description. As utilized herein, the term "and/or" includes any and all combinations of one or more of the associated listed items. Expressions such as "at least one of," when preceding a list of elements, modify the entire list of elements and do not modify the individual elements of the list.

Because the present disclosure to be described may be variously modified and may have one or more suitable embodiments, specific embodiments are illustrated in the drawings and described in more detail in the detailed description. However, this is not intended to limit the present disclosure to a specific embodiment, and it should be understood to include all modifications, equivalents, or substitutes included in the technical scope of the present disclosure.

The terms utilized are only utilized to describe specific embodiments and are not intended to limit the present disclosure. Singular expressions include plural expressions unless the context clearly indicates otherwise. Hereinafter, it will be further understood that the terms "comprise", "include" or "have," when utilized in this specification, specify the presence of stated features, integers, steps, operations, elements, and/or components, but do not preclude the presence or addition of one or more other features, integers, steps, operations, elements, components, and/or groups thereof. The "/" utilized herein may be interpreted as "and" or as "or" depending on the situation.

In the drawings, thickness is enlarged or reduced in order to clearly express one or more suitable layers and regions. Throughout the specification, the same reference numerals designate the same components. Throughout the specification, when a component such as a layer, a film, a region, or a plate is mentioned to be placed "on" another component, it will be understood that it may be directly on another component or that another component may be interposed therebetween. Throughout the specification, although the terms "first", "second", "third", etc., may be utilized herein to describe one or more suitable elements, components, regions, and/or layers, these elements, components, regions, and/or layers should not be limited by these terms. These terms are only utilized to distinguish one component from another component.

The terms "dry" or "dry-type" refer to a state that does not intentionally contact a solvent such as a processing solvent or a state that does not intentionally include a solvent. For example, a dry electrode active material refers to an electrode active material that does not intentionally contact a solvent or an electrode active material that does not intentionally include a solvent. For example, a dry conducting material refers to a conducting material that does not intentionally contact a solvent or a conducting material that does not intentionally include a solvent. For example, a dry binder refers to a binder that does not intentionally contact a solvent or a binder that does not intentionally include a solvent. For example, a binder that is in a liquid state at room temperature without being mixed with a solvent is a dry binder.

Hereinafter, an electrode according to embodiments, a lithium battery including the same, and a method of manufacturing the electrode will be described in more detail.

An electrode according to an embodiment includes: an electrode current collector; and an electrode active material layer disposed on one or both (e.g., opposite) surfaces of the electrode current collector, wherein the electrode active material layer includes a first electrode active material, a second electrode active material, and a binder, the electrode active material layer includes a first cluster, wherein the first cluster is an agglomerate including a plurality of first electrode active materials, one surface of the electrode active material layer includes a first domain including the first cluster, and an area of the first domain is 15% to 60% of the total area of the one surface of the electrode active material layer. The area of the first domain may be, for example, about 20% to about 60%, about 25% to about 60%, about 30% to about 60%, or about 35% to about 60% of the total area of one surface of the electrode active material layer. The total area of one surface of the electrode active material layer may be, for example, the total area of one surface of the electrode perpendicular to the thickness direction of the electrode. By including these area ranges of the first domain of the electrode, the electrolyte impregnation property of the electrode is improved. Accordingly, cyclic characteristics of a lithium battery including such an electrode are improved. The first cluster is an agglomerate including a plurality of first electrode active materials. Specifically, the first cluster may include 4 or more particles of the first active material which lie directly (or are positioned directly) next to each other in the active material layer. Lying or positioned directly to each other means that the particles are in direct contact with each other and/or are only connected by the binder. One surface of the electrode active material layer includes a first domain including the first clusters. In other words, all of the first clusters, which are located on the surface of the electrode active material layer, form the first domain. Specifically, at least the surface opposite to the electrode current collector shows the desired heterogeneous distribution of the particles of the first electrode material and the second electrode material. In particular, all surface areas of the first clusters, which are located on the surface of the electrode material layer, add up to the area of the first domain. The area of the first domain can be obtained by an image analysis of a scanning electron microscope image.

Figure 2:
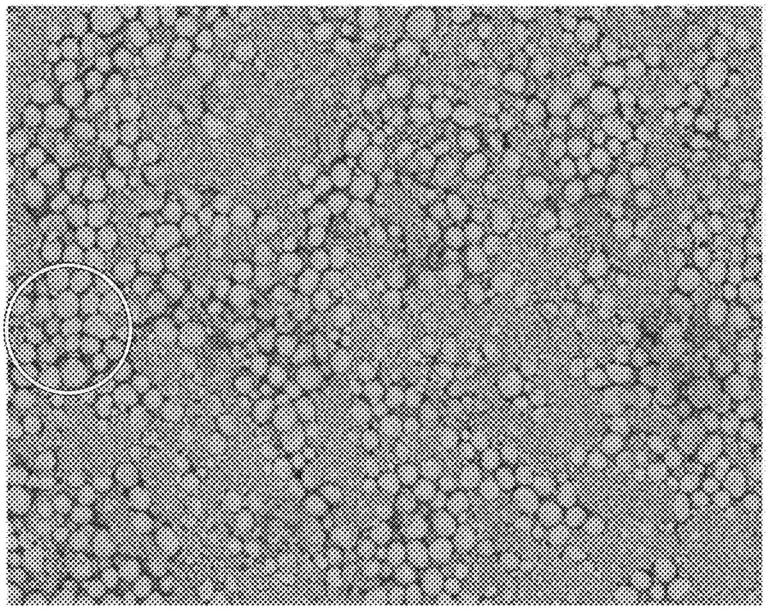
FIG. 2 shows a scanning electron microscope image of one surface of an electrode active material layer included in an electrode prepared in Example 2 according to an embodiment.

Referring to FIGS. 1 and 2, because the first cluster is an agglomerate of a plurality of first electrode active materials, a relatively increased porosity ratio may be obtained among the first electrode active materials. Therefore, an electrolyte may easily infiltrate into the electrode through the pores between these first electrode active materials. As a result, the electrolyte impregnation property of the electrode is improved. Therefore, the first cluster may provide an increased contact area between the first electrode active material and the electrolyte and, consequently, improve the reversibility of the electrode reaction. For example, even under charge/discharge conditions utilizing an excessive current, the reversibility of the electrode reaction may be maintained.

When the area of the first domain is too small, the electrolyte impregnation property of the electrode is deteriorated, and thus, the high-rate characteristic of a lithium battery including such an electrode may be deteriorated. When the area of the first domain is too large, the electrolyte impregnation property of the electrode is improved, but when the contact area between the electrode and the electrolyte is increased too much, and more side reactions may occur at the interface between the first electrode active material and the electrolyte. Accordingly, the lifespan characteristics of a lithium battery including such an electrode may be deteriorated. In some embodiments, due to the great increase in the porosity ratio of the electrode, the energy density of a lithium battery including such an electrode may be reduced.

The number of the plurality of first electrode active materials included in the first cluster may be, for example, about 4 to about 200, about 6 to about 150, about 8 to about 100, or about 10 to about 50. Within these numbers of the first electrode active materials included in the first cluster, the electrolyte impregnation property of the electrode may be further improved. When the number of first electrode active materials included in the first cluster is too small, agglomerates may not be properly formed.

The area occupied by one first cluster on one surface of the electrode active material layer may be, for example, about 2500 $\mu m^2$ or more. The area occupied by one first cluster on one surface of the electrode active material layer may be, for example, about 2500 $\mu m^2$ to about 100,000 $\mu m^2$, about 2500 $\mu m^2$ to about 50,000 μm or about 2500 $\mu m^2$ to about 30,000 $\mu m^2$, about 2500 $\mu m^2$ to about 20,000 $\mu m^2$, or about 2500 $\mu m^2$ to about 10,000 $\mu m^2$. When the area occupied by the first cluster is less than about 2500 $\mu m^2$, the effect on the improvement of the electrolyte impregnation property of the electrode may be insignificant.

One surface of the electrode active material layer may further include, for example, a second domain including a second cluster, in addition to the first domain including the first cluster. The second domain may include, for example, the second electrode active material and a binder. The second cluster may include, for example, an agglomerate including a plurality of the second electrode active materials and a binder. In an embodiment, in one surface of the electrode active material layer, one or more second clusters included in the second domain may be disposed between one or more first clusters included in the first domain. By disposing a plurality of second clusters among the plurality of first clusters, the energy density of electrodes including the same may be improved.

The first electrode active material may be, for example, a large-particle diameter electrode active material of which a particle diameter is greater than that of the second electrode active material, and the second electrode active material may be, for example, a small-particle diameter electrode active material of which a particle diameter is smaller than the first electrode active material. The first electrode active material and the second electrode active material may each be, for example, a cathode active material. The first electrode active material and the second electrode active material may be, for example, a first lithium transition metal oxide and a second lithium transition metal oxide, respectively. The first lithium transition metal oxide may be a greater particle diameter lithium transition metal oxide, and the second lithium transition metal oxide may be a lithium transition metal oxide having a smaller particle diameter. For example, the first electrode active material may be a greater (larger) particle diameter lithium transition metal oxide, and the second electrode active material may be a smaller particle diameter lithium transition metal oxide. For example, the second electrode active material of which a particle diameter is smaller than that of the first electrode active material, may be disposed in the pores among the first electrode active materials. Because particles of the second electrode active material, which are particles of smaller particle diameter, are placed in pores among particles of the first electrode active material, which are particles of greater particle diameter, ionic conductivity and electronic conductivity of an electrode containing the first electrode active materials and the second electrode active materials are concurrently (e.g., simultaneously) improved. In some embodiments, the energy density of the electrode may be improved. As a result, the energy density of a lithium battery including such an electrode may be improved, and cyclic characteristics thereof may be improved. In an embodiment, the first electrode active material and the second electrode active material may each be, for example, an anode active material.

The first electrode active material and the second electrode active material may each have, for example, a bimodal particle diameter distribution in a distribution profile according to a particle diameter, that is, a particle size distribution diagram. For example, the mixture of the first electrode active material and the second electrode active material may have a bimodal particle diameter distribution having two peaks in a particle size distribution diagram obtained by utilizing a particle size analyzer (PSA) and/or the like. The bimodal particle diameter distribution may have a first peak corresponding to the first electrode active material and a second peak corresponding to the second electrode active material. Because the first electrode active material and the second electrode active material each have such a bimodal particle diameter distribution, the energy density of the electrode including the first electrode active material and the second electrode active material is further improved, and cyclic characteristics of a lithium battery including the electrode may be improved.

The particle diameter ratio of the first electrode active material and the second electrode active material may be, for example, about 3:1 to about 40:1, about 3:1 to about 30:1, about 3:1 to about 20:1, or about 3:1 to about 10:1. When the first electrode active material and the second electrode active material have these ranges of particle diameters, the energy density of the electrode including the first electrode active material and the second electrode active material may be further improved, and the cyclic characteristics of a lithium battery having such an electrode may also be improved.

The particle diameter of the first electrode active material may be, for example, about 15 μm to about 30 μm, about 15 μm to about 27 μm, or about 15 μm to about 25 μm. The particle diameter of the second electrode active material may be, for example, about 1 μm to about 6 μm, about 1 μm to about 5 μm, about 2 μm to about 5 μm, or about 2 μm to about 4 μm. When the first electrode active material and the second electrode active material each have these ranges of particle diameters, the energy density and/or cyclic characteristics of the lithium battery including the first electrode active material and the second electrode active material may be further improved. The particle diameters of the first electrode active material and the second electrode active material may each be, for example, an average particle diameter. The average particle diameter may be measured utilizing, for example, a laser diffraction method or a dynamic light scattering method. The average particle diameter thereof is measured utilizing a laser scattering particle size distribution meter (for example, LA-920 of Horiba Corporation), and is a value of the median diameter (D50) when the metal oxide particles are accumulated to about 50% from small particles in volume conversion. In an embodiment, the average particle diameter may be, for example, an arithmetic mean value of the particle diameters of the particles measured through an image analysis performed by utilizing software or a manual on a scanning electron microscope image.

The weight ratio of the first electrode active material and the second electrode active material may be, for example, about 9:1 to about 6:4 or about 8:2 to about 7:3. When the first electrode active material and the second electrode active material have these ranges of weight ratios, the energy density of the electrode including the first electrode active material and the second electrode active material may be further improved, and the cyclic characteristics of a lithium battery having such an electrode may also be improved.

The mixture density of the electrode active material layer may be, for example, about 1 g/cm$^3$ to about 5 g/cm$^3$, about 2 g/cm$^3$ to about 5 g/cm$^3$, about 3 g/cm$^3$ to about 5 g/cm$^3$, or about 3 g/cm$^3$ to about 4 g/cm$^3$. The mixture density of the electrode active material layer may be derived by measuring the volume and weight of an electrode active material layer included in a prepared electrode. When the electrode active material layer has these ranges of mixture density, a lithium battery including an electrode may provide improved energy density and excellent or suitable high-rate characteristics at the same time.

The binder included in the electrode active material layer may be, for example, a dry binder. A dry binder may be, for example, a binder that is not impregnated, dissolved or dispersed in a solvent. A dry binder may be, for example, a binder that contains or does not contact a solvent.

The dry binder may be, for example, a fibrillized binder. The fibrillized binder may function as a matrix which supports and binds the electrode active material and other components included in the electrode active material layer. The fibrillized binder may be identified as, for example, having a fibrous shape, in a scanning electron microscope image of the cross section of the electrode. The fibrillized binder may have an aspect ratio of, for example, about 10 or more, about 20 or more, about 50 or more, or about 100 or more. The dry binder may be, for example, polytetrafluoroethylene (PTFE), a polyvinylidene fluoride-hexafluoropropylene (PVDF-HFP) copolymer, polyvinylidene fluoride (PVDF), polyvinyl alcohol, polyacrylonitrile, carboxymethylcellulose (CMC), starch, hydroxypropylcellulose, cellulose, polyvinylpyrrolidone, polyethylene, polypropylene, ethylene-propylene-diene polymer (EPDM), sulfonated-EPDM, styrene butadiene rubber (SBR), fluororubber, or one or more copolymers thereof, etc., but is not necessarily limited thereto, and the dry binder may be any binder that is utilized in the manufacture of dry electrodes. The dry binder may include, for example, a fluorine-based binder. The fluorine-based binder may be, for example, polytetrafluoroethylene (PTFE), a polyvinylidene fluoride-hexafluoropropylene (PVDF-HFP) copolymer, or polyvinylidene fluoride (PVDF). The amount of the dry binder included in the electrode active material layer may be, for example, about 1 wt % to about 10 wt %, or about 1 wt % to about 5 wt %, based on the total weight of the electrode active material layer. Because the electrode active material layer includes such amount ranges of dry binder, the binding force of the electrode may be improved and the high energy density of the electrode may be maintained.

The electrode active material layer may further include, for example, a conductive material. The conductive material may be, for example, a dry conductive material. A dry conductive material may be, for example, a conductive material that is not impregnated, dissolved, or dispersed in a solvent. The dry conductive material may be, for example, a conductive material that does not contain or does not contact a solvent. The dry conductive material may be, for example, a carbonaceous conductive material, a metal-based conductive material, or a combination thereof. The dry conductive material may be, for example, a carbonaceous conductive material. The carbonaceous conductive material may be carbon black, graphite fine particles, natural graphite, artificial graphite, acetylene black, Ketjen black, carbon fiber; carbon nanotubes, and is not limited thereto, and may be any material that is utilized as a carbonaceous conductive material in the art. The amount of the dry conductive material included in the electrode active material layer may be, for example, about 1 wt % to about 10 wt %, or about 1 wt % to about 5 wt %, based on the total weight of the electrode active material layer. Because the electrode active material layer includes such amount ranges of dry conductive material, the conductive properties of the electrode may be improved and the high energy density of the electrode may be maintained.

The electrode active material layer may be, for example, a self-standing film. In an embodiment, the electrode active material layer may retain a film shape without a support. Therefore, the electrode active material layer may be prepared as a separate self-standing film and then placed on an electrode current collector. Because manufactured in a dry process, the electrode active material layer may not include (e.g., may exclude) a processing solvent that is intentionally added. For example, a residual processing solvent may not be included. Although a trace amount of unintentional solvent may remain in the electrode active material layer, this solvent is not an intentionally added processing solvent. Accordingly, the electrode active material layer is distinguished from a wet electrode active material layer which is prepared by mixing components and a processing solvent and then removing some or all of the processing solvent therefrom by drying.

The electrode current collector may additionally include a coating layer disposed on one or both (e.g., simultaneously) surfaces of the electrode current collector.

A material constituting the electrode current collector may be any material that does not react with lithium, that is, a material that does not form an alloy or compound with lithium and has conductivity (e.g., is a conductor). A metal substrate may be made from, for example, metal or alloy. The metal substrate may be, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The electrode current collector may have, for example, a form selected from a sheet, foil, film, plate, a porous body, a mesoporous body, a through-hole containing body, a polygonal ring body, a mesh body, a foam body, and a nonwoven body. However, the electrode current collector is not limited thereto, and may be any form that is utilized in the art. The electrode current collector may include, for example, a base film and a metal layer disposed on one or both sides of the base film. The base film may include, for example, a polymer. The polymer may include, for example, polyethylene terephthalate (PET), polyethylene (PE), polypropylene (PP), polybutylene terephthalate (PBT), polyimide (PI), or combinations thereof. The metal layer may include, for example, copper (Cu), stainless steel, titanium (Ti), iron (Fe), cobalt (Co), nickel (Ni), or an alloy thereof. The electrode current collector has a structure comprising a base film and at least one coating layer thereon. Thus, the weight of the electrode can be reduced and, the energy density of the lithium battery can be improved.

In an embodiment, a coating layer may be disposed directly on one side or both (e.g., simultaneously) sides of the electrode current collector. Therefore, another layer may not be disposed between the electrode current collector and the coating layer. Because the coating layer is disposed directly on one side or both (e.g., simultaneously) sides of the electrode current collector, the binding force between the electrode current collector and the electrode active material layer may be further increased. The thickness of the coating layer may be, for example, 30% or less of the thickness of the electrode current collector. The thickness of the coating layer may be, for example, about 0.01% to about 30%, about 0.1% to about 30%, about 0.5% to about 30%, about 1% to about 25%, about 1% to about 20%, about 1% to about 15%, about 1% to about 10%, about 1% to about 5%, or about 1% to about 3%, of the thickness of the electrode current collector. The thickness of the coating layer may be, for example, about 10 nm to about 5 μm, about 50 nm to about 5 μm, about 200 nm to about 4 μm, about 500 nm to about 3 μm, about 500 nm to about 2 μm, about 500 nm to about 1.5 μm, or about 700 nm to about 1.3 μm. When the coating layer has these thickness ranges, the binding force between the electrode current collector and the electrode active material layer may be further enhanced, and the increase in interfacial resistance may be suppressed or reduced.

The coating layer may include, for example, a binder. Due to the inclusion of the binder in the coating layer, the binding force between the electrode current collector and the electrode active material layer may be further improved. The binder included in the coating layer may be, for example, a conductive binder or a non-conductive binder. The conductive binder may be, for example, an ion conductive binder, and/or an electronically conductive binder. A binder having both (e.g., simultaneously) ion conductivity and electronic conductivity may belong to both (e.g., simultaneously) an ion conductive binder and an electronically conductive binder. The ion conductive binder may be, for example, polystyrene sulfonate (PSS), polyvinylidene fluoride-hexafluoropropylene copolymer (PVDF-HFP), polyvinyl fluoride (PVF), polyvinylidene fluoride (PVDF), poly(methylmethacrylate) (PMMA), polyethylene oxide (PEO), polyethylene glycol (PEG), polyacrylonitrile (PAN), polytetrafluoro ethylene (PTFE), polyethylenedioxythiophene (PEDOT), polypyrrole (PPY), polyaniline, or polyacetylene. The ion conductive binder may include a polar functional group. An ion conductive binder containing a polar functional group may be, for example, Nafion, Aquivion, Flemion, Gore, Aciplex, Morgane ADP, sulfonated poly(ether ether ketone) (SPEEK), sulfonated poly(arylene ether ketone ketone sulfone (SPAEKKS), sulfonated poly(aryl ether ketone) (SPAEK), poly[bis(benzimidazobenzisoquinolinones)] (SPBIBI), poly(styrene sulfonate) (PSS), lithium 9,10-diphenylanthracene-2-sulfonate ($DPASLi^+$), and/or the like. The electronically conductive binder may be, for example, polyacetylene, polythiophene, polypyrrole, poly (p-phenylene), poly(phenylenevinylene), poly(phenylenesulfide), polyaniline, and/or the like. The coating layer may be, for example, a conductive layer including a conductive polymer. The binder included in the coating layer may be selected from, for example, binders included in the electrode active material layer. The coating layer may contain substantially the same binder as in the electrode active material layer. The binder included in the coating layer may be, for example, a fluorine-based binder. The fluorine-based binder included in the coating layer may be, for example, polyvinylidene fluoride (PVDF). In an embodiment, the coating layer may be placed on the electrode current collector by a dry method or a wet method. The coating layer may be, for example, a binding layer including a binder.

The coating layer may include, for example, a carbonaceous conductive material. The carbonaceous conductive material included in the coating layer may be selected from carbonaceous conductive materials included in the electrode active material layer. The coating layer may contain substantially the same carbonaceous conductive material as in the electrode active material layer. Because the coating layer includes a carbonaceous conductive material, the coating layer may be, for example, a conductive layer. The coating layer may be, for example, a conductive layer including a binder and a carbonaceous conductive material.

In an embodiment, the coating layer may be disposed on the electrode current collector by a dry method by deposition such as chemical vapor deposition (CVD) or physical vapor deposition (PVD). In an embodiment, the coating layer may be disposed on the electrode current collector in a wet method by spin coating, dip coating, and/or the like. In an embodiment, a coating layer may be disposed on the electrode current collector by depositing a carbonaceous conductive material on the electrode current collector by deposition. The coating layer formed by a dry coating may include (e.g., consist of) a carbonaceous conductive material and may not contain a binder. In some embodiments, the coating layer may be disposed on the electrode current collector by coating a composition including a carbonaceous conductive material, a binder, and a solvent on the surface of the electrode current collector and then drying the same. The coating layer may have a single-layer structure or a multilayer structure including a plurality of layers.

The electrode current collector may have a reduced thickness compared to an electrode current collector included in an electrode of the related art. Accordingly, by including a thin film current collector, an electrode according to an embodiment may be distinguished from an electrode of the related art including a thick-film current collector. Because an electrode according to an embodiment includes a thin film current collector having a reduced thickness, the thickness of the electrode active material layer in the electrode including the thin film current collector may be relatively increased. As a result, the energy density of a lithium battery including such an electrode is increased. The thickness of the electrode current collector including the metal substrate and the coating layer may be, for example, less than about 15 μm, less than about 14.5 μm, or less than about 14 μm. The thickness of the electrode current collector may be, for example, less than about 0.1 μm to about 15 μm, about 1 μm to about 14.5 μm, about 2 μm to about 14 μm, about 3 μm to about 14 μm, about 5 μm to about 14 μm, or about 10 μm to about 14 μm.

When the electrode active material layer is measured utilizing a surface and interfacial measuring analysis system (SAICAS), with respect to the entire thickness of the electrode active material layer, the ratio of change in the vertical relative force ($F_{VR}$) according to the depth from a first point spaced about 5% from the surface of the electrode active material layer in the direction from the surface of the electrode active material layer to the electrode current collector to a second point spaced about 5% apart from the surface of the electrode current collector in the direction from the surface of the electrode current collector to the electrode active material layer, may be, for example, about 300% or less. The change rate of the vertical relative force may be, for example, about 10% to about 300%, about 10% to about 250%, about 10% to about 200%, about 10% to about 150%, or about 10% to about 100%. The second point spaced about 5% apart from the surface of the electrode current collector in the direction from the surface of the electrode current collector to the electrode active material layer, may be, for example, a point spaced about 95% from the surface of the electrode active material layer in the direction from the surface of the electrode active material layer to the electrode current collector, with respect to the entire thickness of the electrode active material layer. The vertical relative force may be calculated from Equation 1. Evaluation Example 1 may be referred to, for the SAICAS measurement method.

$$\text{Rate of change in vertical relative force } (Fv) = [(\text{maximum value of vertical relative force } (F_{VR1}) - \text{minimum value of vertical relative force } (F_{VR1}))/\text{minimum value of vertical relative force } (F_{VR1})] \times 100 \quad \text{Equation 1}$$

Because the ratio of change in the vertical relative force is 300% or less when SAICAS is measured on the electrode active material layer, the uniformity of the distribution of the components in the electrode may be improved. In some embodiments, because a side reaction and an increase in internal resistance due to substantially non-uniform distribution of components in the electrode active material layer are suppressed or reduced, the reversibility of the electrode reaction may be improved. Even in the case of an electrode having a high loading, the cyclic characteristics of a lithium battery may be improved. In some embodiments, when the electrode includes an interlayer, the binding force of the electrode active material layer and the electrode current collector is further improved, and the internal resistance of the electrode is reduced. Accordingly, the cyclic characteristics of a lithium battery including such an electrode may be improved.

When SAICAS is measured on the electrode active material layer, with respect to the entire depth from the surface of the electrode active material layer to the surface of the electrode current collector, the horizontal force ratio of a second horizontal force ($F_{H2}$) at a second point about 10% apart from the surface of the electrode current collector in the direction from the surface of the electrode current collector to the electrode active material layer (for example, a depth direction) to a first horizontal force ($F_{H1}$) at a first point about 10% apart from the surface of the electrode active material layer in the direction from the surface of the electrode active material layer to the electrode current collector, may be, for example, about 50% or more. The horizontal force ratio may be, for example, about 50% to about 100%, about 60% to about 100%, about 70% to about 100%, about 80% to about 100%, or about 90% to about 100%. The second point spaced about 10% apart from the surface of the electrode current collector in the direction from the surface of the electrode current collector to the electrode active material layer, may be, for example, a point spaced about 90% from the surface of the electrode active material layer in the direction from the surface of the electrode active material layer to the electrode current collector, with respect to the entire thickness of the electrode active material layer. The horizontal force ratio is expressed as Equation 2, for example. Evaluation Example 2 may be referred to, for the SAICAS measurement method.

$$\text{Horizontal force ratio} = [\text{second horizontal force } (F_{H2})/\text{first horizontal force } (F_{H1})] \times 100 \quad \text{Equation 2}$$

When SAICAS is measured, due to the horizontal force ratio of about 50% or more, the uniformity of the distribution of components in the electrode may be further improved. Because the electrode has these ranges of horizontal force, the cyclic characteristics of a lithium battery including the electrode are further improved.

The electrode described above may be, for example, a cathode. The cathode may include a cathode active material layer, and the cathode active material layer may include a cathode active material.

As a cathode active material included in the cathode active material layer, any lithium metal oxide may be utilized without limitation as long as it is utilized in the art.

The cathode active material may be, for example, one or more types (kinds) of a complex oxide of lithium and a metal selected from cobalt, manganese, nickel, and combinations thereof. The cathode active material may be, for example, a compound represented by at least one selected from the following formulae: $Li_aA_{1-b}B_bD_2$ (where $0.90 \le a \le 1$, and $0 \le b \le 0.5$); $Li_aE_{1-b}B_bO_{2-c}D_c$ (where $0.90 \le a \le 1$, $0 \le b \le 0.5$, and $0 \le c \le 0.05$); $LiE_{2-b}B_bO_{4-c}D_c$ (where $0 \le b \le 0.5$, and $0 \le c \le 0.05$); $Li_aNi_{1-b-c}Co_bB_cD_\alpha$ (where $0.90 \le a \le 1$, $0 \le b \le 0.5$, $0 \le c \le 0.05$, and $0 < \alpha \le 2$); $Li_aNi_{1-b-c}Co_bB_cO_{2-\alpha}F_\alpha$ (where $0.90 \le a \le 1$, $0 \le b \le 0.5$, $0 \le c \le 0.05$, and $0 < \alpha < 2$); $Li_aNi_{1-b-c}Co_bB_cO_{2-\alpha}F_2$ (where $0.90 \le a \le 1$, $0 \le b \le 0.5$, $0 \le c \le 0.05$, and $0 < \alpha < 2$); $Li_aNi_{1-b-c}Mn_bB_cD_\alpha$ (where $0.90 \le a \le 1$, $0 \le b \le 0.5$, $0 \le c \le 0.05$, and $0 < \alpha \le 2$); $Li_aNi_{1-b-c}Mn_bB_cO_{2-\alpha}F_\alpha$ (where $0.90 \le a \le 1$, $0 \le b \le 0.5$, $0 \le c \le 0.05$, and $0 < \alpha < 2$); $Li_aNi_{1-b-c}Mn_bB_cO_{2-\alpha}F_2$ (where $0.90 \le a \le 1$, $0 \le b \le 0.5$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0.1$); $Li_aNi_bCo_cMn_dG_eO_2$ (where $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$ and $0.001 \le b \le 0.1$); $Li_aCoG_bO_2$ (where $0.9 \le a \le 1$ and $0.001 \le b \le 0.1$); $Li_aMnG_bO_2$ (where $0.90 \le a \le 1$ and $0.001 \le b \le 0.1$); $Li_aMn_2G_bO_4$ (where $0.90 \le a \le 1$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the Formulas representing these compounds, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

A compound in which a coating layer is provided on the surface of these compounds may be utilized, and a mixture of these compounds and the compound provided with the coating layer may also be utilized. The coating layer provided on the surface of these compound may include a coating element compound such as oxide of a coating element, hydroxide of a coating element, oxyhydroxide of a coating element, oxycarbonate of a coating element, or hydroxycarbonate of a coating element. The compound constituting this coating layer is amorphous or crystalline. The coating element included in the coating layer may be Mg, Al, Co, K, Na, Ca, Si, Ti, V, Sn, Ge, Ga, B, As, Zr, or a mixture thereof. The method of forming the coating layer is selected within a range that does not adversely affect the physical properties of the cathode active material. The coating method may be, for example, spray coating, dipping method, and/or the like. A detailed description of the coating method will not be provided because it may be well understood by those in the art.

The amount of the cathode active material included in the cathode active material layer may be, for example, about 80 wt % to about 98 wt %, or about 90 wt % to about 98 wt %, based on the total weight of the cathode active material layer.

The cathode active material may be, for example, a composite cathode active material.

A composite cathode active material may include, for example, a core including lithium transition metal oxide and a shell located on and conformed to the core, wherein the shell includes: graphene; and at least one type or kind of a first metal oxide represented by the formula MaOb ($0<a\leq 3$, $0<b<4$, and when a is 1, 2, or 3, b is not an integer), wherein the first metal oxide is located inside the matrix of graphene, and M is at least one metal selected from Groups 2 to 13, Group 15, or Group 16 of the Periodic Table of Elements, the lithium transition metal oxide includes nickel, and the amount of nickel is 80 mol % or more based on the total number of moles of the transition metal. A shell including a first metal oxide and carbonaceous material is disposed on and/or conform to a core of the composite cathode active material.

Uniform coating of carbonaceous material on the core is difficult due to aggregation. On the other hand, the composite cathode active material uses a composite including a plurality of first metal oxides disposed within a carbonaceous material matrix, thereby preventing or reducing the aggregation of carbonaceous material and placing a substantially uniform shell on the core. Accordingly, a contact between a core and an electrolyte is effectively blocked, thereby preventing or reducing the side reactions due to the contact between the core and the electrolyte. Further, reduction ($Ni^{3+}\rightarrow Ni^{2+}$) of nickel ions due to the electrolyte and the mixing of cations due to the electrolyte are suppressed or reduced, thereby preventing or reducing the formation of a resistance layer such as a NiO phase. Moreover, elution of nickel ions is also suppressed or reduced. The carbonaceous material may be for example a crystalline carbonaceous material. The carbonaceous material may be a carbonaceous nanostructure. The carbonaceous material may be graphene. In this case, because the shell including graphene has flexibility, a change in volume of the composite cathode active material is easily accepted during charge and discharging, occurrence of cracks in the composite cathode active material is suppressed or reduced. Because graphene has high electronic conductivity, interfacial resistance between the composite cathode active material and the electrolyte decreases. Therefore, despite the introduction of a shell containing graphene, internal resistance of a lithium battery is maintained or reduced. Further, because the first metal oxide has voltage resistance, it is possible to prevent or reduce the deterioration of the lithium transition metal oxide included in the core during charging and discharging at a high voltage. As a result, the cyclic characteristics and high-temperature stability of a lithium battery including a composite cathode active material are improved. The shell may include, for example, one kind of first metal oxide or two or more kinds of different first metal oxides. Further, in the composite cathode active material, the lithium transition metal oxide has a nickel content (e.g., amount) of about 80 mol % or more based on the total moles of transition metals, and the shell including the first metal oxide and the carbonaceous material is disposed on the core, thereby concurrently (e.g., simultaneously) providing high discharge capacity and cycle characteristics. Accordingly, the composite cathode active material having a nickel content (e.g., amount) of about 80 mol % or more may provide improved capacity and excellent or suitable lifetime characteristics as compared with a composite cathode active material having a relatively low nickel content (e.g., amount). The metal included in the first metal oxide may be at least one selected from Al, Nb, Mg, Sc, Ti, Zr, V, W, Mn, Fe, Co, Pd, Cu, Ag, Zn, Sb, and Se.

The first metal oxide may be, for example, at least one selected from $Al_2O_z$ ($0<z<3$), $NbO_x$ ($0<x<2.5$), $MgO_x$ ($0<x<1$), $Sc_2O_z$ ($0<z<3$), $TiO_y$ ($0<y<2$), $ZrO_y$ ($0<y<2$), $V_2O_z$ ($0<z<3$), $WO_y$ ($0<y<2$), $MnO_y$ ($0<y<2$), $Fe_2O_z$ ($0<z<3$), $Co_3O_w$ ($0<w<4$), $PdO_x$ ($0<x<1$), $CuO_x$ ($0<x<1$), $AgO_x$ ($0<x<1$), $ZnO_x$ ($0<x<1$), $Sb_2O_z$ ($0<z<3$), and $SeO_y$ ($0<y<2$). Because such a first metal oxide is placed in a carbonaceous material matrix, uniformity of the shell placed on the core is improved, and voltage resistance of the composite cathode active material is further improved. For example, the shell includes $Al_2O_x$ ($0<x<3$) as the first metal oxide. The shell may further include at least one kind of second metal oxide represented by $M_aO_c$ ($0<a\leq 3$, $0<c\leq 4$, when a is 1, 2, or 3, c is an integer). M is at least one metal selected from Groups 2 to 13, Group 15, and Group 16 of the Periodic Table of Elements. For example, the second metal oxide includes the same metal as the first metal oxide, and the ratio c/a of c to a in the second metal oxide is greater than the ratio b/a of b to a in the first metal oxide. For example, $c/a>b/a$. The second metal oxide is selected from $Al_2O_3$, NbO, $NbO_2$, $Nb_2O_5MgO$, $Sc_2O_3$, $TiO_2$, $ZrO_2$, $V_2O_3$, $WO_2$, $MnO_2$, $Fe_2O_3$, $Co_3O_4$, PdO, CuO, AgO, ZnO, $Sb_2O_3$, and $SeO_2$. The first metal oxide is a reduction product of the second metal oxide. The first metal oxide is obtained by reducing a part or all of the second metal oxide. Accordingly, the first metal oxide has a lower oxygen content (e.g., amount) and a higher metal oxidation number than the second metal oxide. For example, the shell includes $Al_2O_x$ ($0<x<3$) as the first metal oxide and $Al_2O_3$ as the second metal oxide. In the composite cathode active material, for example, the carbonaceous material included in the shell is chemically bonded to the transition metal of the lithium transition metal oxide included in the core through a chemical bond. A carbon atom (C) of the carbonaceous material in the shell is chemically bonded to a transition metal (Me) of the lithium transition metal oxide utilizing an oxygen atom as an intermediate through C—O-Me bonding (for example, C—O—Ni bonding). The carbonaceous material included in the shell is chemically bonded to the lithium transition metal oxide included in the core to allow the core and the shell to be a composite. Therefore, the composite of the core and the shell is distinguished from a simple physical mixture of carbonaceous material and lithium transition metal oxide. Further, the first metal oxide and carbonaceous material included in the shell are chemically bonded through a chemical bond. Here, the chemical bond is covalent bonding or ionic bonding. The covalent bond is, for example, a bond including at least one of an ester group, an ether group, a carbonyl group, an amide group, a carbonate anhydride group, or an acid anhydride group. The ionic bond may be, for example, a bond including a carboxylic acid ion, an ammonium ion, or an acyl cation group. The thickness of the shell may be, for example, about 1 nm to about 5 mm, about 1 nm to about 1 mm, about 1 nm to about 500 nm, about 1 nm to about 200 nm, about 1 nm to about 100 nm, about 1 nm to about 90 nm, about 1 nm to about 80 nm, about 1 nm to about 70 nm, about 1 nm to about 60 nm, about 1 nm to about 50 nm, about 1 nm to about 40 nm, about 1 nm to about 30 nm, about 1 nm to about 20 nm, or about 1 nm to about 10 nm. When the thickness of the shell is within the above range, an increase in internal resistance of a lithium battery including the composite cathode active material is suppressed or reduced.

The amount of the composite included in the composite cathode active material may be about 3 wt % or less, about 2 wt % or less, about 1 wt % or less, about 0.5 wt % or less, or about 0.2 wt % or less, based on the total weight of the composite cathode active material. The amount of the composite may be about 0.01 wt % to about 3 wt %, about 0.01 wt % to about 1 wt %, about 0.01 wt % to about 0.7 wt %, about 0.01 wt % to about 0.6 wt %, about 0.1 wt % to about 0.5 wt %, about 0.01 wt % to about 0.2 wt %, about 0.01 wt % to about 0.1 wt %, or about 0.03 wt % to about 0.07 wt %, based on the total weight of the composite cathode active material. When the composite cathode active material includes these ranges of composite, the cycle characteristics of the lithium battery including the composite cathode active material are further improved. The particle diameter (of at least one selected from the first metal oxide and the second metal oxide included in the composite) may be about 1 nm to about 1 μm, about 1 nm to about 500 nm, about 1 nm to about 200 nm, about 1 nm to about 100 nm, about 1 nm to about 70 nm, about 1 nm to about 50 nm, about 1 nm to about 30 nm, about 3 nm to about 30 nm, about 3 nm to about 25 nm, about 5 nm to about 25 nm, about 5 nm to about 20 nm, or about 7 nm to about 20 nm. Within these nanometer ranges of particle diameters, the first metal oxide and/or the second metal oxide may be more uniformly distributed in the matrix of graphene of the composite. Therefore, such a composite may be uniformly applied on the core to form a shell. Further, the first metal oxide and/or the second metal oxide may be more evenly located on the core because the first metal oxide and/or the second metal oxide has a particle diameter within this nanometer range. Therefore, the first metal oxide and/or the second metal oxide may be uniformly located on the core, thereby more effectively exhibiting voltage resistance characteristics. The particle diameter of the first metal oxide and/or the second metal oxide may be, for example, an average particle diameter. The average particle diameter of the first metal oxide and the second metal oxide is measured by a measurement apparatus utilizing a laser diffraction method or a dynamic light scattering method. The average particle diameter thereof is measured utilizing a laser scattering particle size distribution meter (for example, LA-920 of Horiba Corporation), and is a value of the median diameter (D50) when the metal oxide particles are accumulated to about 50% from small particles in volume conversion.

The core included in the composite cathode active material includes, for example, a lithium transition metal oxide represented by Formula 1:

$$Li_aNi_xCo_yM_zO_{2-b}A_b$$

In Formula 1, $1.0 \leq a \leq 1.2$, $0 \leq b \leq 0.2$, $0.8 \leq x < 1$, $0 \leq y \leq 0.3$, $0 < z \leq 0.3$, and $x+y+z=1$, M is at least one selected from manganese (Mn), niobium (Nb), vanadium (V), magnesium (Mg), gallium (Ga), silicon (Si), tungsten (W), molybdenum (Mo), iron (Fe), chromium (Cr)), copper (Cu), zinc (Zn), titanium (Ti), aluminum (Al), and boron (B), and A is F, S, CI, Br, and a combination thereof.

The core included in the composite cathode active material may include lithium transition metal oxide represented by Formulas 2 to 4:

Formula 2

$$LiNi_xCo_yMn_zO_2,$$

Formula 3

$$LiNi_xCo_yAl_zO_2,$$

wherein $0.8 \leq x \leq 0.95$, $0 \leq y \leq 0.2$, $0 < z \leq 0.2$, and $x+y+z=1$, and Formula 4

$$LiNi_xCo_yAl_vMn_wO_2$$

wherein $0.8 \leq x \leq 0.95$, $0 \leq y \leq 0.2$, $0 < v \leq 0.2$, $0 < w \leq 0.2$, and $x+y+v+w=1$.

The electrode described above may be, for example, an anode. The anode may include an anode active material layer, and the anode active material layer may include an anode active material.

Any anode active material may be utilized as long as it is utilized in the art. For example, the anode active material includes at least one selected from a lithium metal, a metal alloyable with lithium, a transition metal oxide, a non-transition metal oxide, and a carbon-based material. Examples of the metal alloyable with lithium include Si, Sn, Al, Ge, Pb, Bi, Sb, an Si—Y alloy (Y is an alkali metal, an alkali-earth metal, a group 13 element, a group 14 element, a transition metal, an rare earth element, or a combination thereof, not Si), and an Sn—Y alloy (Y is an alkali metal, an alkali-earth metal, a group 13 element, a group 14 element, a transition metal, an rare earth element, or a combination thereof, not Sn). The element Y may be, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. The transition metal oxide may be, for example, lithium titanium oxide, vanadium oxide, lithium vanadium oxide and/or the like. The non-transition metal oxide is, for example, $SnO_2$ or $SiO_x$ ($0 < x < 2$). The carbonaceous material is, for example, crystalline carbon, amorphous carbon, or a mixture thereof. The crystalline carbon is, for example, graphite such as amorphous, plate-like, flake-like, spherical or fibrous natural graphite or artificial graphite. The amorphous carbon is, for example, soft carbon (low-temperature fired carbon), hard carbon, mesophase pitch carbide, or fired coke.

The amount of the anode active material included in the anode active material layer may be, for example, about 80 wt % to about 98 wt %, or about 90 wt % to about 98 wt %, based on the total weight of the anode active material layer.

Figure 5A:
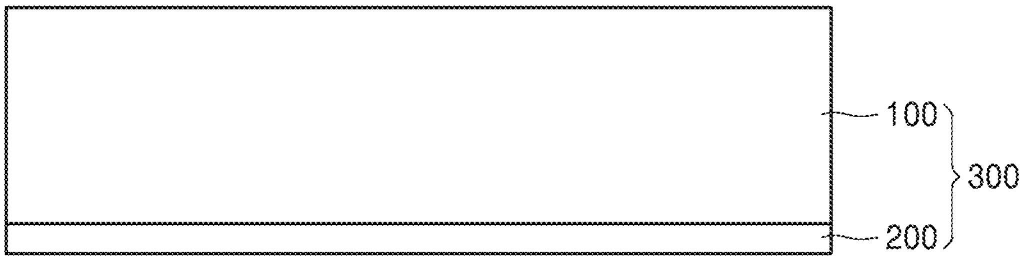
FIGS. 5A-5D are cross-sectional views of electrodes according to an embodiment.

Referring to FIG. 5A, an electrode 300 according to an embodiment includes an electrode current collector 200 and an electrode active material layer 100 disposed on one surface of the electrode current collector 200, and the electrode active material layer 100 includes a first electrode active material, a second electrode active material, and a binder. The electrode 300 may be, for example, a dry electrode. For example, the first electrode active material and the second electrode active material may each be a dry electrode active material, and the binder may be a dry binder.

Figure 5B:
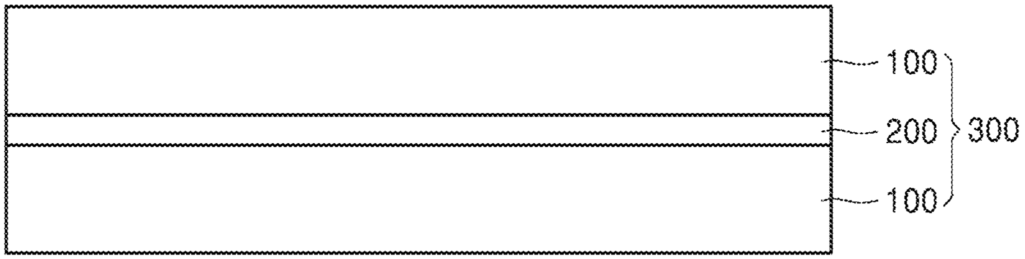

Referring to FIG. 5B, the electrode 300 according to an embodiment includes an electrode current collector 200 and the electrode active material layer 100 disposed on both (e.g., opposite) surfaces of the electrode current collector 200, and the electrode active material layer 100 includes a first electrode active material, a second electrode active material, and a binder. The electrode 300 may be, for example, a dry electrode. For example, the first electrode active material and the second electrode active material may each be a dry electrode active material, and the binder may be a dry binder.

Figure 5C:

Referring to FIG. 5C, the electrode 300 according to an embodiment includes: the electrode current collector 200; the electrode active material layer 100 disposed on one surface of the electrode current collector 200, wherein the electrode active material layer 100 includes a first electrode active material, a second electrode active material, and a binder; and a coating layer 250 located between the electrode active material layer 100 and the electrode current collector 200. The electrode of FIG. 5C has the same configuration as the electrode of FIG. 5A except that the coating layer 250 is additionally included. Because the electrode 300 further includes the coating layer 250, the binding force of the electrode active material layer 100 and the electrode current collector 200 may be improved.

Figure 5D:
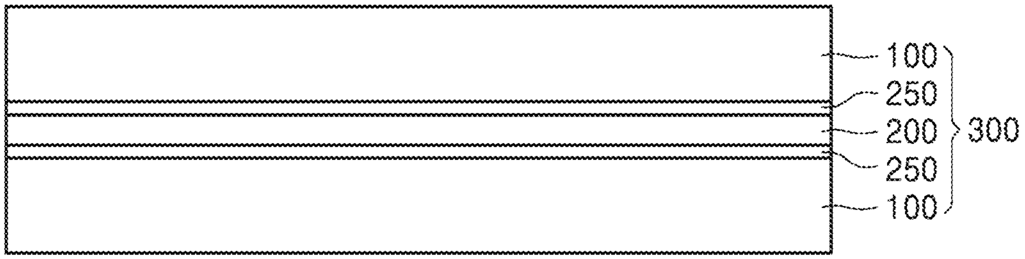

Referring to FIG. 5D, the electrode 300 according to an embodiment includes: the electrode current collector 200; the electrode active material layer 100 disposed on both (e.g., opposite) surfaces of the electrode current collector 200, wherein the electrode active material layer 100 includes a first electrode active material, a second electrode active material, and a binder; and the coating layer 250 located between the electrode active material layer 100 and the electrode current collector 200 on each surface of the electrode current collector 200. The electrode of FIG. 5D has the same configuration as the electrode of FIG. 5B except that the coating layer 250 is additionally included. Because the electrode 300 further includes the coating layer 250, the binding force of the electrode active material layer 100 and the electrode current collector 200 may be improved.

Figure 6:
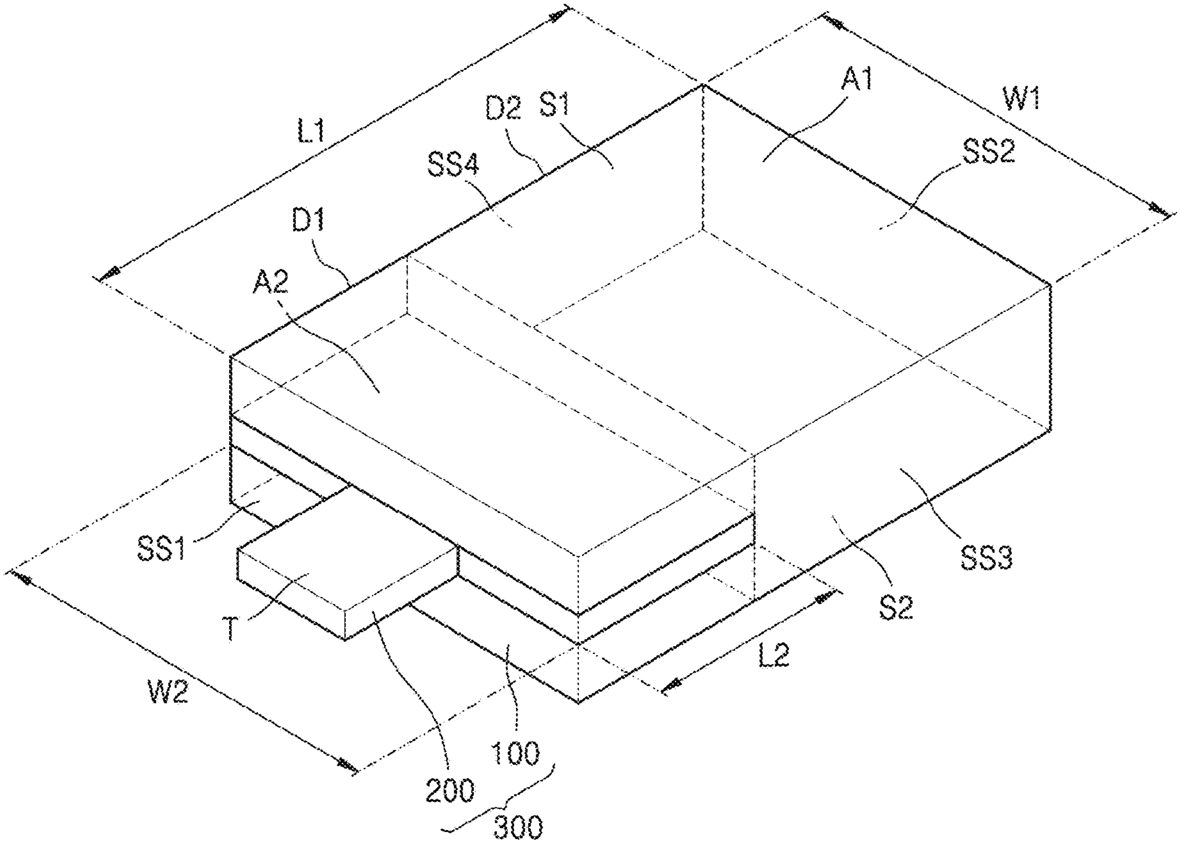
FIG. 6 is a schematic diagram of an electrode according to an embodiment.

Referring to FIG. 6, in the electrode 300 according to an embodiment, the electrode active material layer 100 has a primary surface S1 and a secondary surface S2 opposite to the primary surface S1, a first side surface SS1 and a second side surface SS2 opposite to the first side surface SS1, which are connected to the longitudinal ends of the primary surface S1 and the secondary surface S2, and a third side surface SS3 and a fourth side surface SS4 opposite to the third side surface SS3, which are connected to the widthwise ends of the primary surface S1 and the secondary surface S2. A primary domain D1 is defined by the primary surface S1, the secondary surface S2, the third side surface SS3, and the fourth side surface SS4, and includes the electrode current collector 200 disposed between the first primary surface S1 and the secondary surface S2. A secondary domain D2 is defined by the primary surface S1, the secondary surface S2, the third side surface SS3, and the fourth side surface SS4, and is a domain that is free of the electrode current collector 200 between the primary surface S1 and the secondary surface S2.

Referring to FIG. 6, the electrode active material layer 100 has a first area A1 defined by a lengthwise first distance L1 and a widthwise first distance W1, and the electrode current collector 200 is disposed between the primary surface S1 and the secondary surface S2, and the electrode current collector 200 has a second area A2 defined by a lengthwise second distance L2 and a widthwise second distance W2, and the second area A2 of the electrode current collector 200 is about 90% of the first area A1 of the electrode active material layer 100. For example, the second area A2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20%, of the first area A1 of the electrode active material layer 100. Because the area of the electrode current collector 200 in the electrode 300 is smaller than that of the electrode active material layer 100, the energy density of the lithium battery 1000 including the electrode 300 may be further improved.

Referring to FIG. 6, the lengthwise second distance L2 of the electrode current collector 200 may be about 90% or less of the lengthwise first distance L1 of the electrode active material layer 100. For example, the lengthwise second distance L2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20%, of the lengthwise first distance L1 of the electrode active material layer 100. In some embodiments, the widthwise second distance W2 of the electrode current collector 200 may be less than or equal to about 90% of the widthwise first distance W1 of the electrode active material layer 100. For example, the widthwise second distance W2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20%, of the widthwise first distance W1 of the electrode active material layer 100. For example, the lengthwise second distance L2 of the electrode current collector 200 may be 90% or less of the lengthwise first distance L1 of the electrode active material layer 100, and the widthwise second distance W2 of the electrode current collector 200 may be 90% or less of the widthwise first distance W1 of the electrode active material layer 100. As the electrode current collector 200 has such sizes, the energy density of the lithium battery 1000 including the electrode 300 may be further improved.

Referring to FIG. 6, the electrode current collector 200 is exposed on three or less side surfaces of the first side surface SS1, the second side surface SS2, the third side surface SS3, and the fourth side surface SS4 included in the electrode active material layer 100. Because the electrode current collector 200 has a smaller area than that of the electrode active material layer 100, the electrode current collector 200 may be exposed to some of the side surfaces of the electrode active material layer 100, for example, three, two, or one side surfaces thereof. As the number of side surfaces of the electrode active material layer 100 to which the electrode current collector 200 is exposed decreases, the possibility of a short circuit through the side surface of the electrode active material layer 100 is reduced, so that the safety of the lithium battery 1000 is improved.

Referring to FIG. 6, the electrode current collector 200 has a tab T extending to the outside of the electrode active material layer 100 through at least two sides selected from the first side surface SS1, the second side surface SS2, the third side surface SS3, or the fourth side surface SS4. For example, the tab T extends to the outside of the electrode active material layer 100 through the first side surface SS1 and/or the second side surface SS2. In some embodiments, the tab T extends to the outside of the electrode active material layer 100 through the third side surface SS3 and/or the fourth side surface SS4. As the tab T extends to the outside of the electrode active material layer 100 through one side or two opposite sides, a short circuit by a plurality of adjacent tabs may be prevented or reduced.

Referring to FIGS. 7A to 7F, the electrode current collector 200 disposed in a portion between both (e.g., simultaneously) surfaces of the electrode active material layer 100 may have one or more suitable shapes and may be disposed at one or more suitable positions within the electrode active material layer 100. In FIGS. 7A to 7F, with respect to the electrode active material layer 100 defined by the first side surface SS1, the second side surface SS2, the third side surface SS3 and the fourth side surface SS4, a domain in which the electrode current collector 200 is disposed corresponds to a first domain, and a domain that is free of the electrode current collector 200 corresponds to a second domain.

Figure 7A:
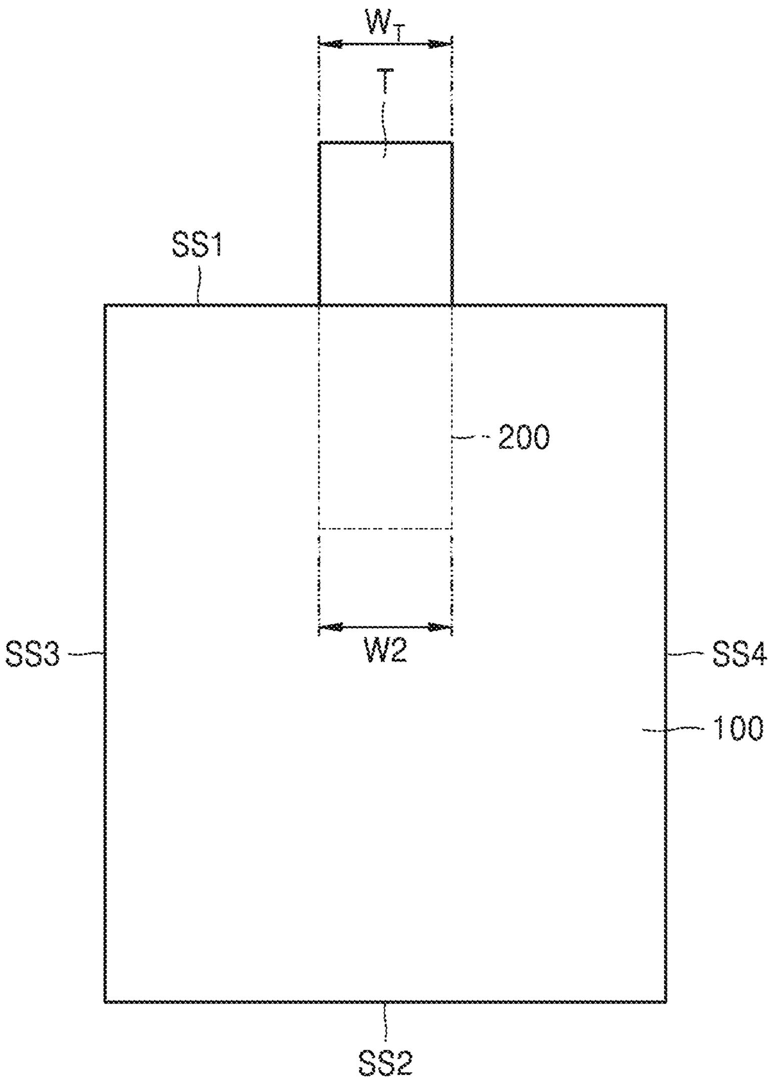
FIGS. 7A-7F are plan views of an electrode according to an embodiment.

Referring to FIG. 7A, the electrode current collector 200 may be disposed in a portion of the electrode active material layer 100 defined by the first side surface SS1, the second side surface SS2, the third side surface SS3, and the fourth side surface SS4. The electrode current collector 200 is exposed by the first side surface SS1 of the electrode active material layer 100, and includes a tab T extending to the outside of the electrode active material layer 100 through the first side surface SS1. The widthwise distance WT of the tap T may be 100% of the widthwise second distance W2 of the electrode current collector 200.

Figure 7B:
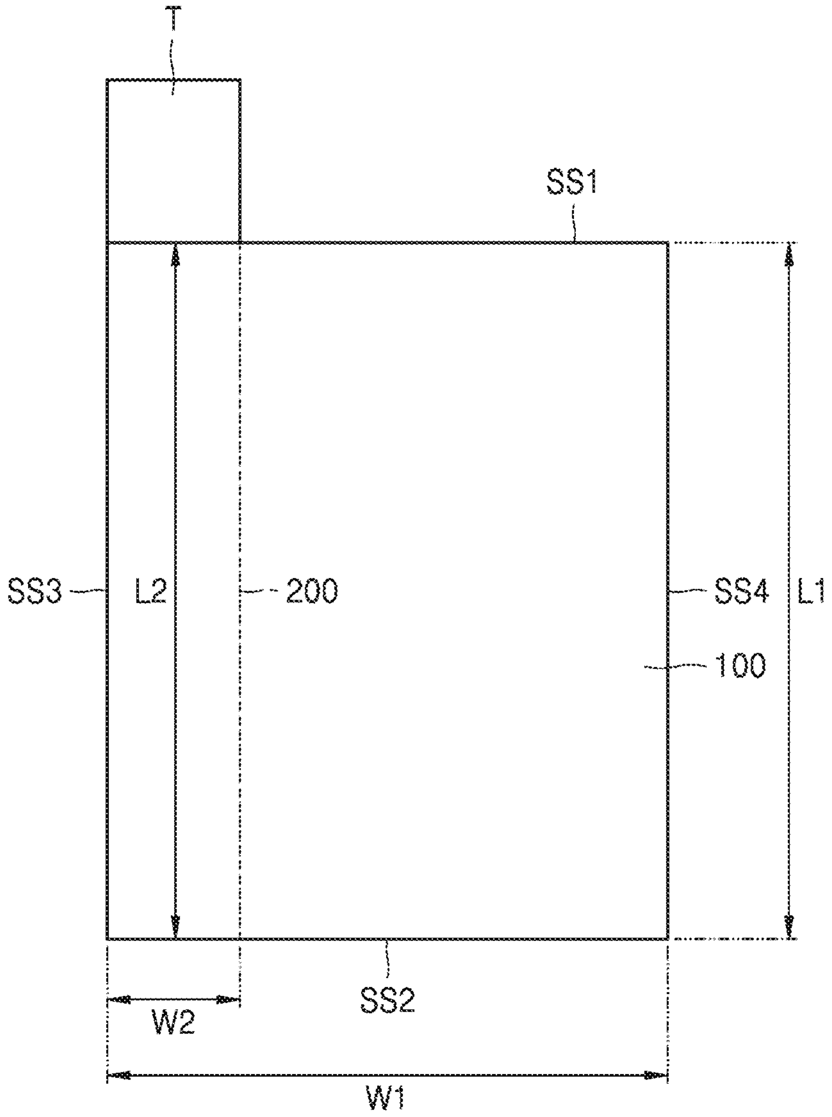

Referring to FIG. 7B, the electrode current collector 200 may be disposed in a portion of the electrode active material layer 100 defined by the first side surface SS1, the second side surface SS2, the third side surface SS3, and the fourth side surface SS4. The electrode current collector 200 is exposed by the first side surface SS1, the second side surface SS2, and the third side surface SS3 of the electrode active material layer 100, and includes a tab T extending to the outside of the electrode active material layer 100 through the first side surface SS1. The lengthwise second distance L2 of the electrode current collector 200 may be 100% of the lengthwise first distance L1 of the electrode active material layer 100. The widthwise second distance W2 of the electrode current collector 200 may be less than 100% of the widthwise first distance W1 of the electrode active material layer 100.

Figure 7C:
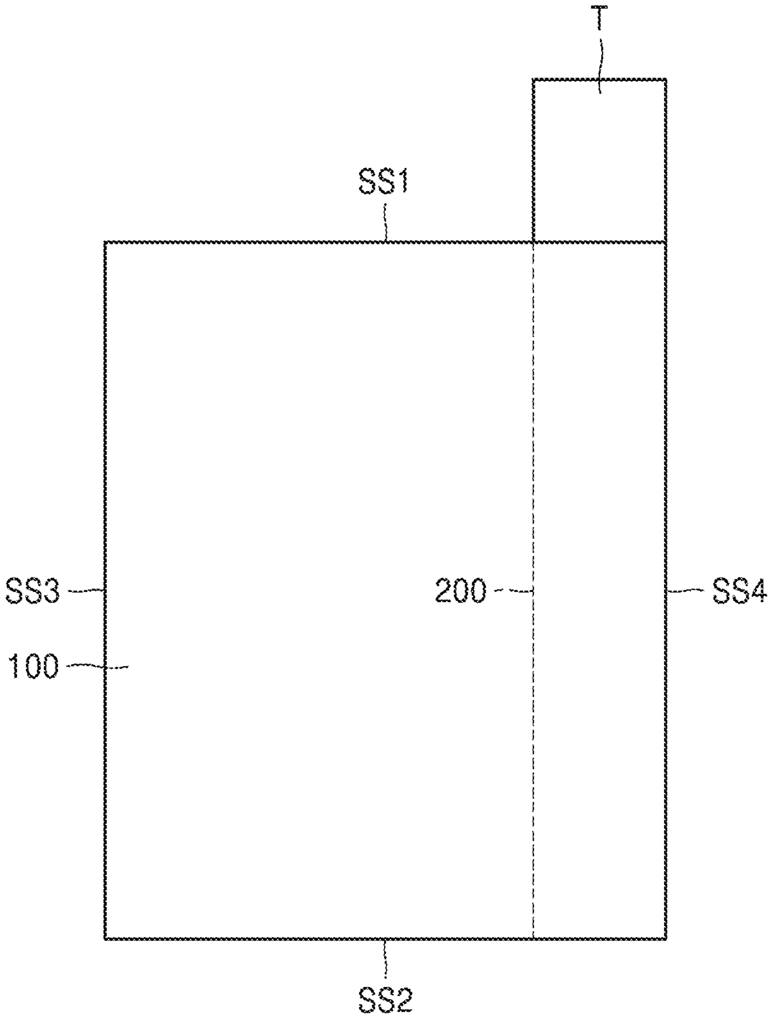

Referring to FIG. 7C, the electrode current collector 200 may be disposed in a portion of the electrode active material layer 100 defined by the first side surface SS1, the second side surface SS2, the third side surface SS3, and the fourth side surface SS4. The electrode current collector 200 is exposed by the first side surface SS1, the second side surface SS2, and the fourth side surface SS4 of the electrode active material layer 100, and includes a tab T extending to the outside of the electrode active material layer 100 through the first side surface SS1.

Figure 7D:
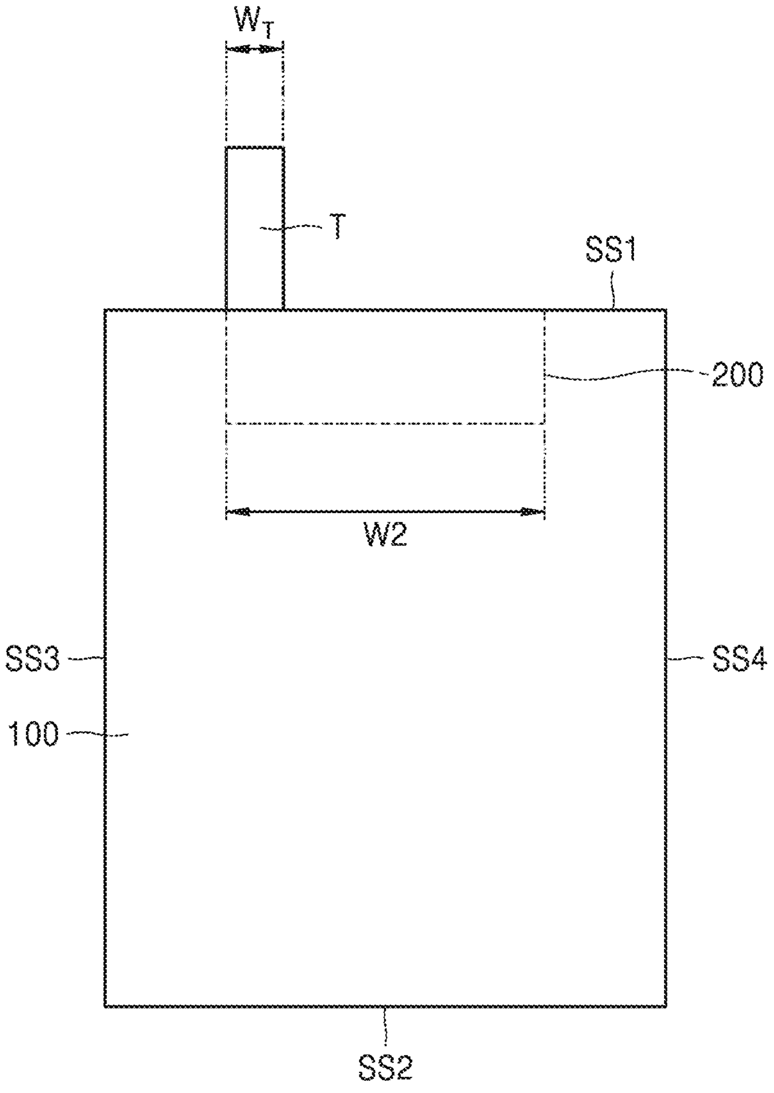

Referring to FIG. 7D, the electrode current collector 200 may be disposed in a portion of the electrode active material layer 100 defined by the first side surface SS1, the second side surface SS2, the third side surface SS3, and the fourth side surface SS4. The electrode current collector 200 is exposed by the first side surface SS1 of the electrode active material layer 100, and includes a tab T extending to the outside of the electrode active material layer 100 through the first side surface SS1. The widthwise distance WT of the tap T may be less than 100% of the widthwise second distance W2 of the electrode current collector 200.

Figure 7E:
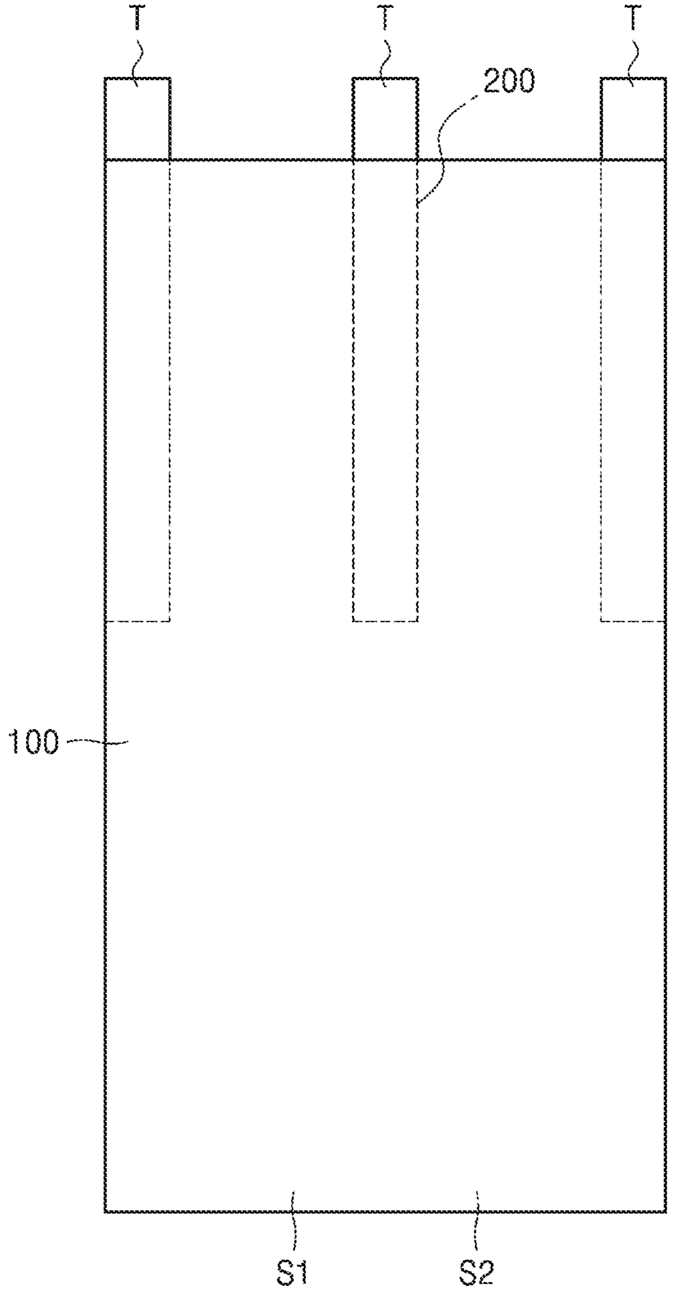
Figure 7F:
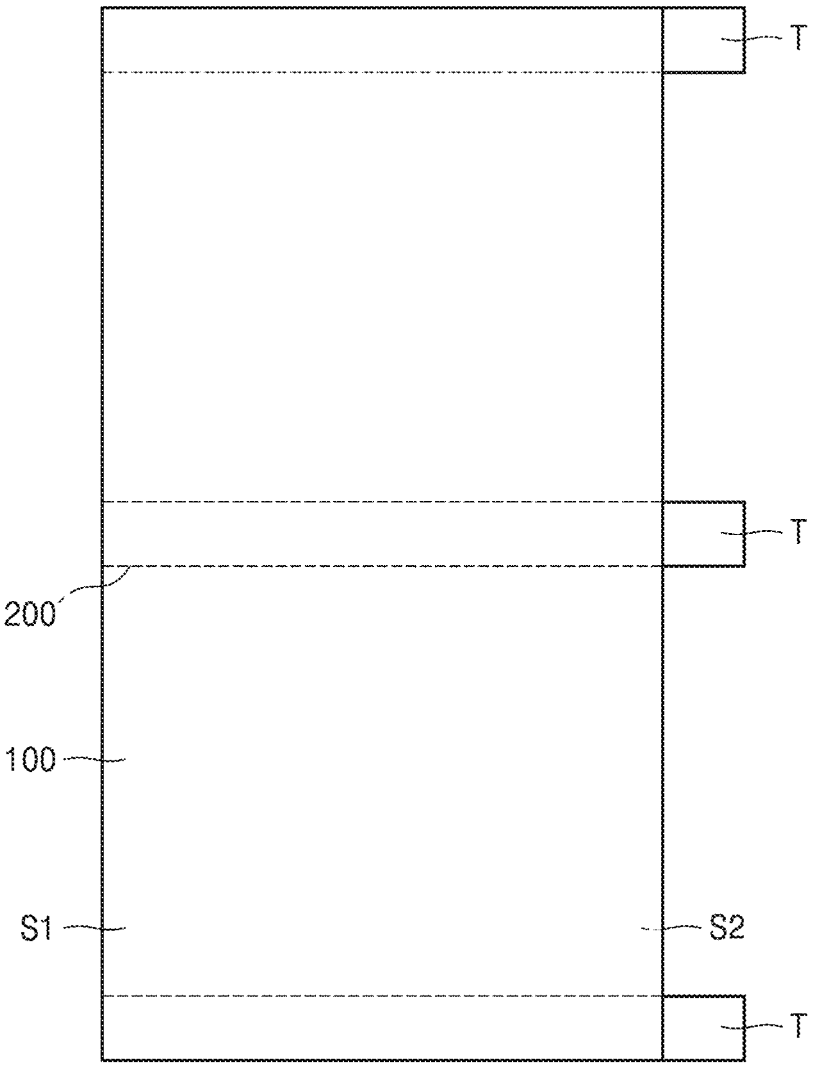

Referring to FIGS. 7E and 7F, a plurality of electrode current collectors 200 may be disposed in a portion of the electrode active material layer 100 defined by the first side surface SS1, the second side surface SS2, the third side surface SS3, and the fourth side surface SS4. The plurality of electrode current collectors 200 are spaced apart from each other in a longitudinal direction or a width direction of the electrode active material layer 100. In an embodiment, the plurality of electrode current collectors 200 may be spaced apart from each other at identical intervals or at different intervals. The plurality of electrode current collectors 200 may form an angle of about 45 degrees or less, about 40 degrees or less, about 30 degrees or less, about 25 degrees or less, about 20 degrees or less, about 15 degrees or less, less than about 10 degrees, or less than about 5 degrees, with respect to one surface of the electrode active material layer 100, for example, at least one of the primary surface S1 and the secondary surface S2 thereof. For example, the plurality of electrode current collectors 200 may form an angle of about 0 degrees with one surface of the electrode active material layer 100, that is, are disposed in parallel thereto. In an embodiment, the plurality of electrode current collectors 200 may be disposed between the primary surface S1 and the secondary surface S2 of the electrode active material layer 100.

Figure 8:
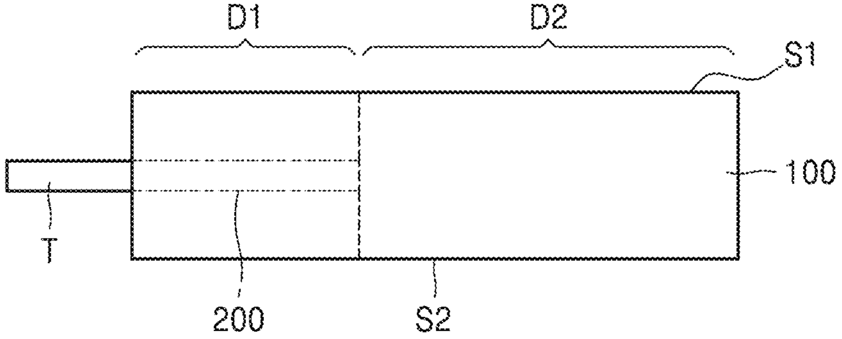
FIG. 8 shows a cross-sectional view of an electrode according to the embodiment.

Referring to FIG. 8, the electrode active material layer 100 includes: a primary domain D1 in which the electrode current collector 200 is disposed between the primary surface S1 and the secondary surface S2; and a secondary domain D2 in which the electrode current collector 200 is not disposed between the primary surface S1 and the secondary surface S2. The mixture density of the electrode active material layer 100 included in the secondary domain D2 may be less than about 99%, about 98% or less, about 97% or less, about 96% or less, about 95% or less, or 90% or less, of the mixture density of the electrode active material layer 100 included in the primary domain D1. For example, the mixture density of the electrode active material layer 100 included in the secondary domain D2 may be about 50% to about 99%, about 60% to about 98%, about 70% to about 97%, about 80% to about 96%, or about 90% to about 95%, of the mixture density of the electrode active material layer 100 included in the primary domain D1.

A lithium battery according to an embodiment includes a cathode, an anode, and an electrolyte located between the cathode and the anode, wherein at least one of the cathode and the anode is the electrode described above.

Figure 9:
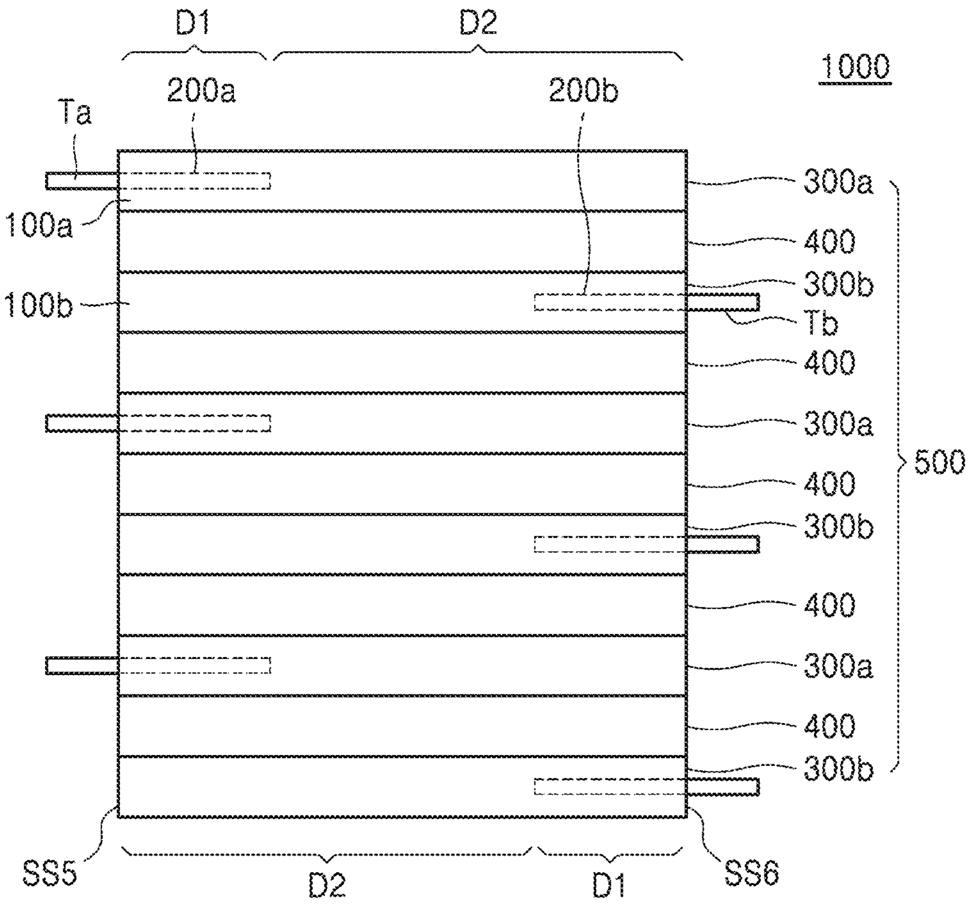
FIG. 9 shows a side view of an electrode assembly according to an embodiment.
Figure 10:
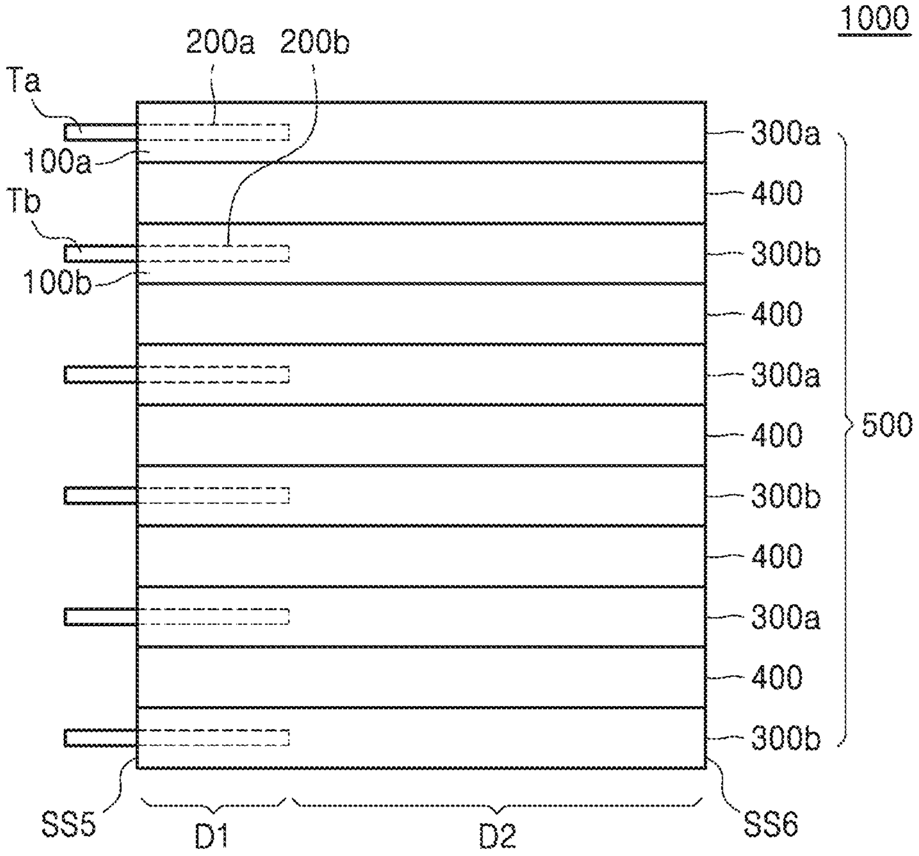
FIG. 10 shows a side view of an electrode assembly according to an embodiment.
Figure 11:
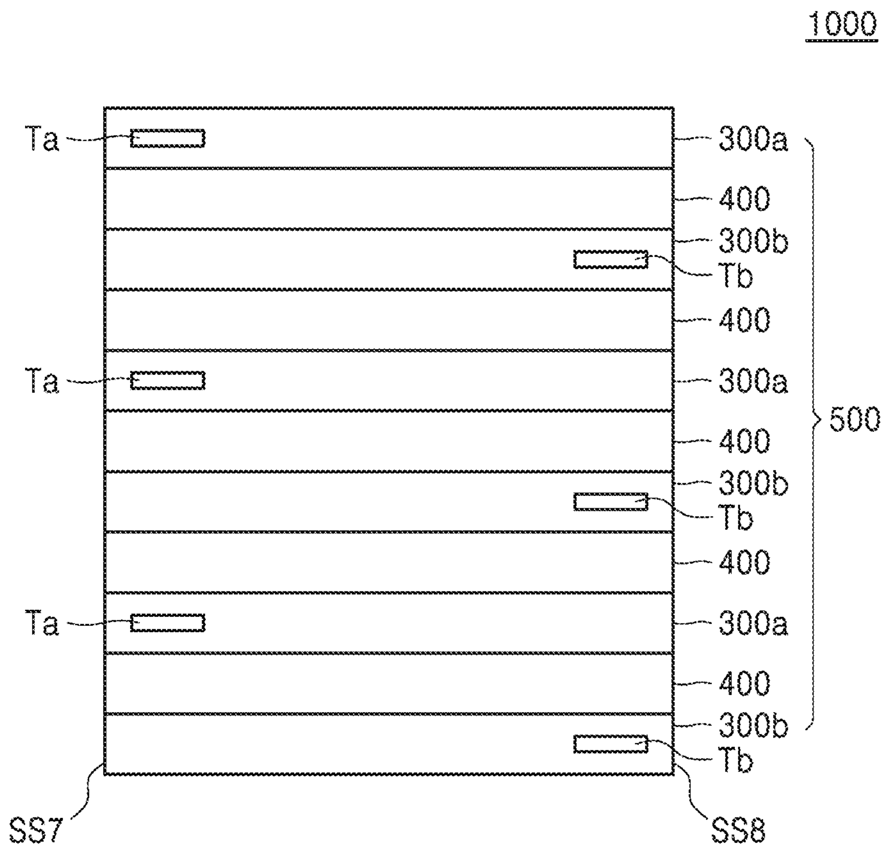
FIG. 11 shows a front view of an electrode assembly according to an embodiment.

Referring to FIGS. 9 to 11, a lithium battery 1000 includes a cathode 300*a*, an anode 300*b*, and an electrolyte 400 disposed between the cathode 300*a* and the anode 300*b*, wherein at least one of the cathode 300*a* and the anode 300*b* is the electrode described above. The lithium battery 1000 includes an electrode assembly 500.

Referring to FIG. 9, the electrode assembly 500 includes: a plurality of cathodes 300*a* stacked along a thickness direction thereof; a plurality of anodes 300*b*, each disposed between adjacent cathodes of the plurality of cathodes 300*a*; a plurality of electrolytes 400 disposed between the plurality of cathodes 300*a* and the plurality of anodes 300*b*. The cathode 300*a* includes a cathode current collector 200*a*, and the cathode current collector 200*a* includes a cathode tab Ta extending to the outside of a cathode active material layer 100*a* through a side surface SS5 of the electrode assembly 500, and the anode 300*b* includes an anode current collector 200*b*, the anode current collector 200*b* includes an anode tab Tb extending to the outside of an anode active material layer 100*b* through another surface SS6 opposing the side surface SS5 of the electrode assembly 500. The lithium battery 1000 includes an electrode assembly 500. Because the cathode tab Ta and the anode tab Tb are disposed on side surfaces opposing each other, the possibility of a short circuit therebetween is reduced.

Referring to FIG. 10, the electrode assembly 500 includes: a plurality of cathodes 300*a* stacked along a thickness direction; a plurality of anodes 300*b* respectively disposed between the plurality of cathodes 300*a*; a plurality of electrolytes 400 are disposed between the plurality of cathodes 300*a* and anodes 300*b*. The cathode 300*a* includes a cathode current collector 200*a*, and the cathode current collector 200*a* includes a cathode tab Ta extending to the outside of a cathode active material layer 100*a* through a side surface SS5 of the electrode assembly 500, and the anode 300*b* includes an anode current collector 200*b*, the anode current collector 200*b* includes an anode tab Tb extending to the outside of an anode active material layer 100*b* through the side surface SS5 of the electrode assembly 500. The lithium battery 1000 includes an electrode assembly 500.

Referring to FIG. 11, a plurality of cathode tabs Ta are disposed at regular intervals on the side surface SS5 in a thickness direction of the electrode assembly 500, and a plurality of anode tabs Tb are disposed at regular intervals in the thickness direction thereof. The plurality of cathode tabs Ta are disposed adjacent to a side surface SS7 in the width direction of the electrode assembly 500, and the plurality of anode tabs Tb are disposed adjacent to another side surface SS8 opposing the side surface SS7 in the width direction of the electrode assembly 500. FIG. 11 is a front view of the side surface SS5 of FIG. 10. The lithium battery 1000 includes an electrode assembly 500.

Although the cathodes tab Ta and the anodes tab Tb are disposed on the same side, because they are disposed to be spaced apart from each other in the width direction, the possibility of a short circuit therebetween is reduced.

The lithium battery 1000 may be, for example, a lithium ion battery, a lithium solid battery, and a lithium air battery.

The electrolyte contained in lithium battery 1000 may be, for example, a liquid electrolyte or a solid electrolyte. The solid electrolyte may be, for example, an oxide-based solid electrolyte or a sulfide-based solid electrolyte.

A method of manufacturing an electrode according to an embodiment is provided.

A method of manufacturing an electrode includes: preparing a dry mixture by dry mixing a first electrode active material, a second electrode active material, a dry conductive material, and a dry binder; forming an electrode active material layer from the dry mixture; roll-pressing the electrode active material layer; and placing a roll-pressed electrode active material layer on an electrode current collector, wherein the electrode includes: an electrode current collector; and an electrode active material layer disposed on one or both (e.g., opposite) surfaces of the electrode current collector, wherein the electrode active material layer includes a first electrode active material, a second electrode active material, and a binder, the electrode active material layer includes a first cluster, wherein the first cluster is an agglomerate including a plurality of first electrode active materials, one surface of the electrode active material layer includes a first domain including the first cluster, and an area of the first domain is about 15% to about 60% of the total area of the one surface of the electrode active material layer.

Because an electrode manufactured by this manufacturing method has the electrode active material layer of which the first domain has the area of about 15% to about 60% of the total area of the one surface of the electrode active material layer, the electrolyte impregnation property is improved, and the cyclic characteristics of the lithium battery utilizing this electrode is improved. In some embodiments, in the electrode manufactured by this manufacturing method, the uniformity of a substantially uniform binding force distribution within the electrode is improved and thus the performance of a lithium battery utilizing this electrode is improved.

First, a dry mixture is prepared by dry mixing a first electrode active material, a second electrode active material, a dry conductive material, and a dry binder. Dry mixing refers to mixing while a processing solvent is not included. The processing solvent may be, for example, solvents utilized in the preparation of electrode slurries. The processing solvent may be, for example, water, NMP, etc., but is not limited thereto, and any processing solvent that is utilized in the preparation of an electrode slurry, may be utilized herein. Dry mixing may be performed utilizing a stirrer at the temperature of, for example, about 25° C. to about 65° C. Dry mixing may be performed utilizing a stirrer at a rotation speed of, for example, about 10 rpm to about 10000 rpm, or about 100 rpm to about 10000 rpm. Dry mixing may be performed utilizing a stirrer, for example, for about 1 minute to about 200 minutes, or about 1 minute to about 150 minutes. The first electrode active material and the second electrode active material are each a dry electrode active material.

Dry mixing may be performed, for example, one or more times. First, a first mixture may be prepared by primary dry mixing an electrode active material, a dry conductive material, and a dry binder. The primary dry mixing may be performed, for example, at a temperature of about 25° C. to about 65° C., at a rotation speed of 2000 rpm or less, and for about 15 minutes or less. The primary dry mixing may be performed, for example, at a temperature of about 25° C. to about 65° C., at a rotation speed of about 500 rpm to about 2000 rpm, for about 5 minutes to about 15 minutes. The electrode active material, the dry conductive material, and the dry binder may be uniformly mixed by the primary dry mixing. Subsequently, a second mixture may be prepared by secondary dry mixing an electrode active material, a dry conductive material, and a dry binder. The secondary dry mixing may be performed, for example, at a temperature of about 25° C. to about 65° C., at a rotation speed of about 4000 rpm or more, and for about 10 minutes or more. The secondary dry mixing may be performed, for example, at a temperature of about 25° C. to about 65° C., at a rotation speed of about 4000 rpm to about 9000 rpm, for about 10 minutes to about 60 minutes. A dry mixture including a fibrillated dry binder may be obtained by secondary dry mixing.

The stirrer may be, for example, a kneader. The stirrer may include: for example, a chamber; one or more rotating shafts which are located inside the chamber and rotate; and a blade rotatably coupled to the rotation shafts and located in the longitudinal direction of the rotation shafts. The blade may be, for example, one or more selected from a ribbon blade, a sigma blade, a jet (Z) blade, a dispersion blade, and a screw blade. By including the blade, it is possible to prepare a dough-like mixture by effectively mixing the electrode active material, the dry conductive material, and the dry binder without a solvent.

As the dry conductive material, carbon black, graphite fine particles, natural graphite, artificial graphite, acetylene black, Ketjen black, carbon fiber; carbon nanotubes; metal powder, metal fiber or metal tube of, for example, copper, nickel, aluminum, or silver; or conductive polymers such as polyphenylene derivatives may be utilized, but the disclosure is not limited thereto. Any conductive material may be utilized as long as it is utilized in the art. The conductive material may be, for example, a carbonaceous conductive material.

Examples of the dry binder include vinylidene fluoride/hexafluoropropylene copolymer, polyvinylidene fluoride, polyacrylonitrile, polymethylmethacrylate, polytetrafluoroethylene (PTFE), mixtures of these polymers, and styrene butadiene A rubber-based polymer, and as the solvent, N-methylpyrrolidone (NMP), acetone, water, etc. are utilized, but are not limited thereto, and any solvent utilized in the art may be utilized.

A plasticizer or a pore former may be further added to the dry mixture to form pores inside an electrode plate.

The amounts of the electrode active material, the dry conductive material, and the dry binder which are utilized in the dry mixture may each independently be the same as described above in connection with an electrode.

The cathode uses a cathode active material as an electrode active material. The cathode active material may be understood by referring to the description provided in connection with the electrode. The anode uses an anode active material as an electrode active material. The anode active material may be understood by referring to the description provided in connection with the electrode.

Next, an electrode active material layer is formed from the dry mixture.

In an embodiment, the prepared dry mixture may be put into an extruder and extruded to form an electrode active material layer.

The electrode active material layer may be extruded into a sheet form. The pressure at the time of extrusion may be, for example, about 4 MPa to about 100 MPa, or about 10 MPa to about 90 MPa. The resulting mixture may be a self-standing film in the form of a sheet.

The electrode active material layer may be, for example, an electrode active material layer self-standing film.

Next, the electrode active material layer is roll-pressed.

The electrode active material layer in the form of a self-standing film is roll-pressed to prepare a roll-pressed electrode active material layer.

The roll-pressing may be, for example, a roll press, a flat press, and/or the like, but is not necessarily limited thereto. The pressure during roll-press may be, for example, about 1.0 ton/$cm^2$ to about 10.0 ton/$cm^2$. When the pressure during roll-pressing is excessively increased, the electrode active material layer may crack. When the pressure during roll-press is too low, the mixture density of the electrode active material layer may be lowered.

Next, an electrode current collector is provided.

The electrode current collector may additionally include a coating layer disposed on one or both (e.g., opposite) surfaces of the electrode current collector.

The providing the electrode current collector may include, for example, disposing a coating layer on one or both (e.g., opposite) surfaces of the electrode current collector.

A material for the electrode current collector may be understood by referring to the description provided in connection with the electrode current collector. A cathode current collector may be, for example, aluminum foil. An anode current collector may be, for example, copper foil.

In the disposing the coating layer on one or both (e.g., opposite) surfaces of the electrode current collector, the coating layer may be disposed on one or both (e.g., opposite) surfaces of the electrode current collector by a dry or wet method. The specific coating method may be understood by referring to the description provided in connection with the electrode current collector including the coating layer.

Next, the roll-pressed electrode active material layer is placed on one or both (e.g., opposite) surfaces of the electrode current collector to manufacture an electrode in which the electrode active material layer is disposed on one or both (e.g., opposite) surfaces of the electrode current collector. For example, an electrode may be manufactured by laminating the roll-pressed electrode active material layer on an electrode current collector.

The lithium battery is manufactured by the following example method, but the disclosure is not necessarily limited to this method and the method may vary according to required conditions.

First, one or all of the cathode and the anode may be manufactured according to the electrode manufacturing method described above. In some embodiments, when one of the cathode and the anode is manufactured by the electrode manufacturing method described above, the other electrode may be manufactured by the wet manufacturing method. For example, another electrode may be prepared by preparing an electrode slurry including an electrode active material, a conductive material, a binder, and a solvent, and coating the prepared electrode slurry on an electrode current collector and drying the same. The conductive material and binder included in an electrode prepared utilizing a wet method may be selected from the conductive material and the binder which are utilized in the production of the dry electrode.

Next, a separator to be inserted between the cathode and the anode is prepared.

Any separator may be utilized as long as it is commonly utilized in lithium batteries. As the separator, for example, a separator having low resistance to ion movement of an electrolyte and an excellent or suitable electrolyte-moisturizing ability is utilized. The separator may be a non-woven fabric or a woven fabric including at least one selected from fiberglass, polyester, Teflon, polyethylene, polypropylene, polytetrafluoroethylene (PTFE), and a combination thereof. For a lithium-ion battery, for example, a rollable separator including polyethylene, polypropylene, and/or the like is utilized, and for a lithium-ion polymer battery, a separator having excellent or suitable organic electrolyte impregnation ability is utilized.

The separator is manufactured by the following example method, but the present disclosure is not necessarily limited to this method and is adjusted according to required conditions.

First, a polymer resin, a filler, and a solvent are mixed to prepare a separator composition. The separator composition is directly applied and dried on an electrode to form a separator. In some embodiments, a film obtained by casting and drying the separator composition on a support and then separating the composition from the support is laminated on the electrode to form a separator.

The polymer utilized for manufacturing the separator is not particularly limited, and any polymer may be utilized as long as it is utilized for the binder of an electrode plate may be utilized. For example, as the polymer, a vinylidene fluoride/hexafluoropropylene copolymer, polyvinylidene fluoride (PVDF), polyacrylonitrile, polymethyl methacrylate, or a mixture thereof is utilized.

Next, an electrolyte is prepared.

The electrolyte is, for example, an organic electrolyte. The organic electrolyte is prepared, for example, by dissolving a lithium salt in an organic solvent.

As the organic solvent, any organic solvent may be utilized as long as it is utilized in the art. The organic solvent is, for example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, or a mixture thereof.

As the lithium salt, any lithium salt may be utilized as long as it is utilized in the art. The lithium salt is, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (here, x and y are natural numbers), LiCl, LiI, or a mixture thereof.

In some embodiments, the electrolyte may be a solid electrolyte. The solid electrolyte is, for example, boron oxide or lithium oxynitride, but is not limited thereto. Any solid electrolyte may be utilized as long as it is utilized in the art. The solid electrolyte may be formed on the anode by a method such as sputtering, or a separate solid electrolyte sheet is laminated on the anode. The solid electrolyte may be, for example, an oxide-based solid electrolyte or a sulfide-based solid electrolyte.

Figure 12:
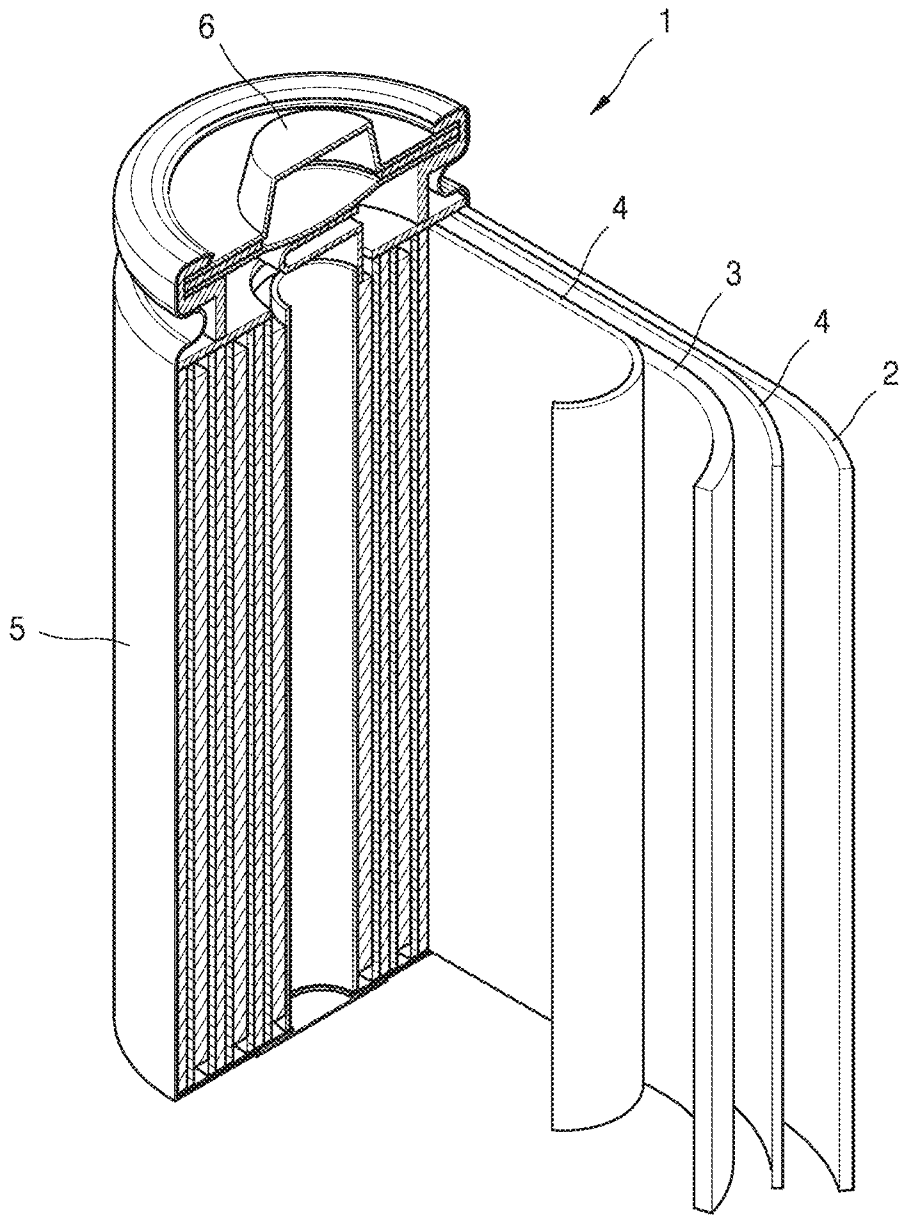
FIG. 12 shows a schematic view of a lithium battery according to an embodiment.

Referring to FIG. 12, a lithium battery 1 according to an embodiment includes a cathode 3, an anode 2, and a separator 4. The cathode 3, the anode 2, and the separator 4 may be wound or folded to form a battery structure 7. The battery structure 7 is accommodated in a battery case 5. An organic electrolyte is injected into the battery case 5, and the battery case 5 is sealed with a cap assembly 6 to complete the lithium battery 1. The battery case 5 is cylindrical, but is not necessarily limited to this shape, and, for example, the shape thereof is a square, a thin film, and/or the like.

Figure 13:
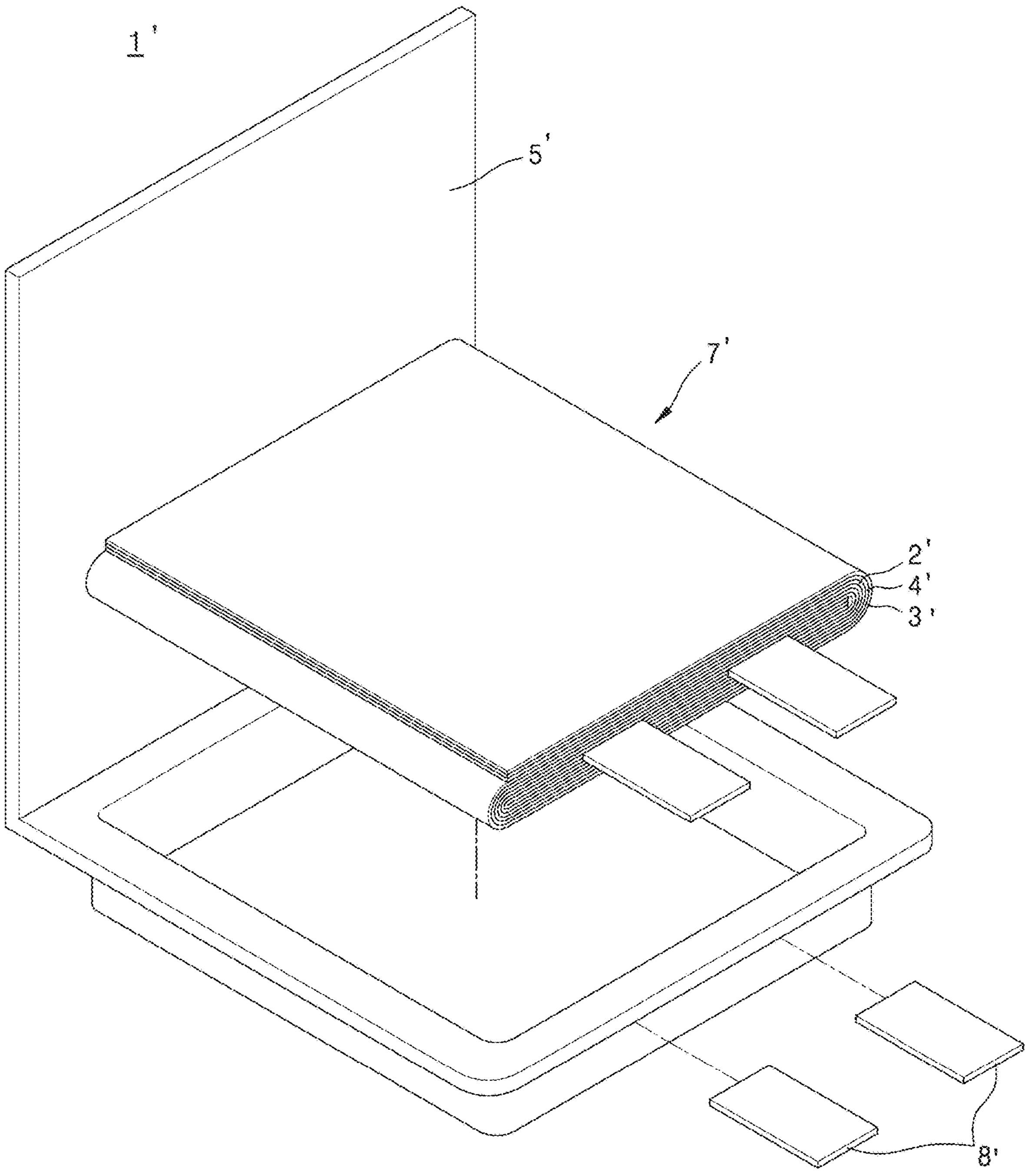
FIG. 13 shows a schematic view of a lithium battery according to an embodiment.

Referring to FIG. 13, a lithium battery 1' according to an embodiment includes a cathode 3', an anode 2', and a separator 4'. The separator 4' may be located between the cathode 3' and the anode 2', and the cathode 3' the anode 2', and the separator 4' may be wound or folded to form a battery structure 7'. The battery structure 7' is accommodated in a battery case 5'. An electrode tab 8' acting as an electrical path for inducing the current formed in the battery structure 7' to the outside may be included. An organic electrolyte is injected into the battery case 5' and sealed to complete the manufacture of the lithium battery 1'. The battery case 5' may have a rectangular shape, but is not necessarily limited to such a shape, and may have, for example, a cylindrical shape, a thin film type or kind, and/or the like.

Figure 14:
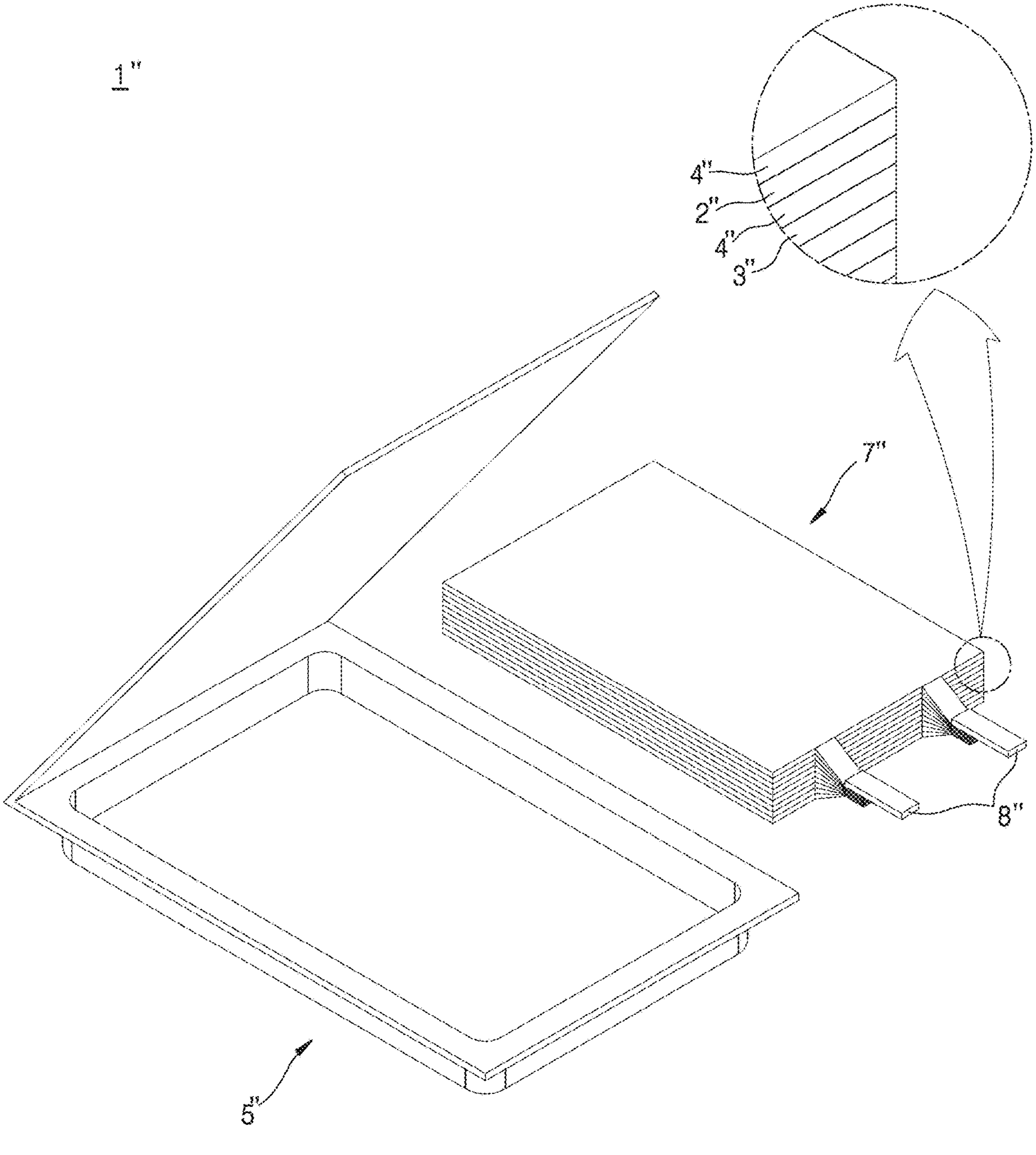
FIG. 14 shows a schematic view of a lithium battery according to an embodiment.

Referring to FIG. 14, a lithium battery 1" according to an embodiment includes a cathode 3", an anode 2", and a separator 4". The separator 4" is located between the cathode 3" and the anode 2" to form a battery structure. The battery structure 7" is stacked in a bi-cell structure, and then accommodated in the battery case 5". An electrode tab 8" acting as an electrical path for inducing the current formed in the battery structure 7" to the outside may be included. An organic electrolyte is injected into the battery case 5" and sealed to complete the manufacture of the lithium battery 1". The battery case 5" may have a rectangular shape, but is not necessarily limited to such a shape, and may have, for example, a cylindrical shape, a thin film type or kind, and/or the like.

A pouch-type or kind lithium battery corresponds to a case where a pouch is utilized as a battery case for each of the lithium batteries of FIGS. 13 to 15. A pouch type or kind lithium battery includes at least one cell structure. A separator is located between a cathode and an anode to form a cell structure. After the cell structure is stacked in a bi-cell structure, it is impregnated with an organic electrolytic solution, and is accommodated and sealed in a pouch to complete a pouch-type or kind lithium battery. For example, in one or more embodiments, the cathode, the anode, and the separator may be simply stacked and accommodated in the form of an electrode assembly in a pouch. In an embodiment, the cathode, the anode, and the separator may be wound or folded into an electrode assembly in the form of a jelly roll, and then, accommodated in the pouch. Then, an organic electrolyte is injected into the pouch, which was then sealed to complete the manufacture of the lithium battery.

Because the lithium battery has excellent or suitable lifetime characteristics and high-rate characteristics, it is utilized in electric vehicles (EVs). For example, the lithium battery is utilized in hybrid vehicles such as plug-in hybrid electric vehicles (PHEVs). Further, the lithium battery is utilized in fields where a large amount of power storage is required. For example, the lithium battery is utilized in electric bicycles, power tools, and/or the like.

A plurality of lithium batteries are stacked to form a battery module, and a plurality of battery modules may form a battery pack. Such a battery pack may be utilized in any device requiring high capacity and high output. For example, the battery pack may be utilized for laptops, smartphones, electric vehicles, etc. The battery module may include, for example, a plurality of batteries and a frame for holding the same. The battery pack may include, for example, a plurality of battery modules and a bus bar connecting the same. The battery module and/or battery pack may further include a cooling device. A plurality of battery packs may be controlled or selected by a battery management system. The battery management system may include a battery pack and a battery control device connected to the battery pack.

The disclosure will be described in more detail through the following examples and comparative examples. However, these examples are only for illustrative purposes, and the scope of the present disclosure is not limited thereto.

(Manufacture of Lithium Battery (Half Cell))

Example 1: Dry Cathode, Bimodal Cathode Active Material, 7:3 of Weight Ratio of Greater Particle Diameter Cathode Active Material to Smaller Particle Diameter Cathode Active Material, Mixture Density of 3.6 g/cm$^3$ (Manufacture of Cathode)

$LiNi_{0.91}Co_{0.05}Al_{0.04}O_2$ (hereinafter, referred to as a greater particle diameter NCA91) having a greater particle diameter of average particle diameter (D50) 18 μm, which is a first cathode active material, $LiNi_{0.91}Co_{0.05}Al_{0.04}O_2$ (hereinafter referred to as a smaller particle diameter NCA91) having a smaller particle diameter of average particle diameter (D50) 3 μm, which is a second cathode active material, a carbon conductive material (Denka Black), which is a dry conductive material, and polytetrafluoroethylene (PTFE), which is dry binder, were put into the blade mixer at a weight ratio of 67.2:28.8:1.8:2.2, and then, primary dry mixing was performed thereon at 25° C. at a speed of 1000 rpm for 10 minutes to prepare a first mixture in which the first and second cathode active materials, the conductive material, and the binder were uniformly mixed.

Then, in order to allow the binder to be fibrillated, the first mixture was subjected to a secondary mixing at 25° C. at a speed of 1000 rpm for 10 minutes to prepare a second mixture. A separate solvent was not utilized in the preparation of the first mixture and the second mixture.

The prepared second mixture was put into an extruder and extruded to prepare a self-standing film of a cathode active material layer in the form of a sheet. The pressure at the time of extrusion was 50 MPa.

The prepared cathode active material layer self-standing film was roll-pressed to prepare a roll-pressed cathode active material layer self-standing film. The pressure during roll-press was 4 ton/$cm^2$.

A cathode current collector was prepared in which a carbon layer, which is a coating layer, was disposed on one surface of an aluminum thin film having a thickness of 12 μm.

The carbon layer was prepared by coating a composition including a carbon conductive material (Danka black) and polyvinylidene fluoride (PVDF) on an aluminum thin film and then drying the same. The thickness of the carbon layer located on one surface of the aluminum thin film was about 1 μm.

The roll-pressed cathode active material layer self-standing film was placed on one surface of the cathode current collector on which the carbon layer was disposed.

The mixture density of the cathode active material layer was 3.6 g/$cm^3$. The thickness of the cathode active material layer was 100 μm.

FIG. 1 shows a scanning electron microscope image of the surface of the cathode prepared in Example 1. The circled part is a first domain including a first cluster.

The area of the first domain including the first cluster was 51.4% of the total area of the cathode active material layer surface.

(Manufacture of Coin Cells)

A coin cell was manufactured utilizing the cathode prepared above, lithium metal as a counter electrode, PTFE separator and 1.3M $LiPF_6$ EC (ethylene carbonate)+EMC (ethyl methyl carbonate)+DMC (dimethyl carbonate) (3:4:3 volume ratio) as an electrolyte.

Example 2: Dry Cathode, Bimodal Cathode Active Material, 7:3 of Weight Ratio of Greater Particle Diameter Cathode Active Material to Smaller Particle Diameter Cathode Active Material, Mixture Density of 3.0 g/$cm^3$ A cathode and a lithium battery were manufactured in substantially the same manner as in Example 1, except that the mixture density of the cathode active material layer was changed to be 3.0 g/$cm^3$.

The area of the first domain including the first cluster was 57.7% of the total area of the cathode active material layer surface.

FIG. 2 shows a scanning electron microscope image of the surface of the cathode prepared in Example 2. The circled part is a first domain including a first cluster.

Example 3: Dry Cathode, Bimodal Cathode Active Material, 8:2 of Weight Ratio of Greater Particle Diameter Cathode Active Material to Smaller Particle Diameter Cathode Active Material, Mixture Density of 3.6 g/$cm^3$ A cathode and a lithium battery were manufactured in substantially the same manner as in Example 1, except that the weight ratio of $LiNi_{0.91}Co_{0.05}Al_{0.04}O_2$ (hereinafter, referred to as a greater particle diameter NCA91) having a greater particle diameter of average particle diameter (D50) 18 μm, which is a first cathode active material, $LiNi_{0.91}Co_{0.05}Al_{0.04}O_2$ (hereinafter referred to as a smaller particle diameter NCA91) having a smaller particle diameter of average particle diameter (D50) 3 μm, which is a second cathode active material, a carbon conductive material (Denka Black), which is a dry conductive material, and polytetrafluoroethylene (PTFE), which is dry binder, was changed to be 76.8:19.2:1.8:2.2.

Figure 3A:
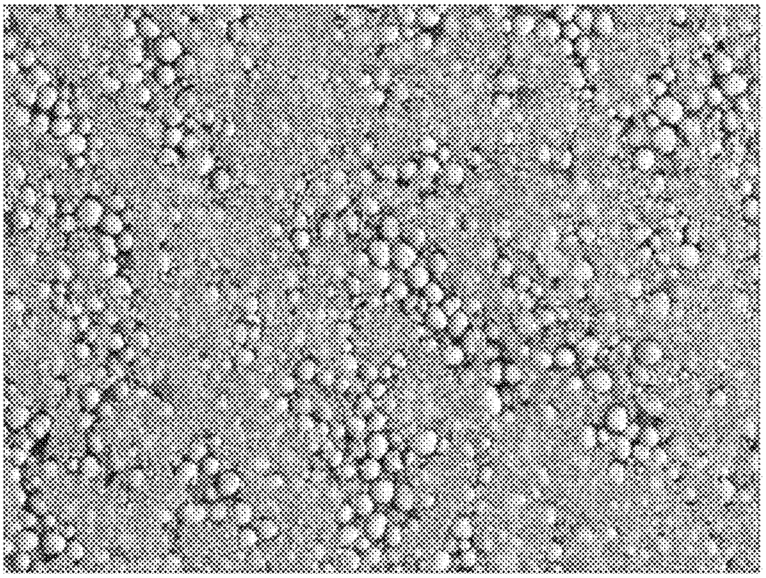
FIG. 3A shows a scanning electron microscope image of one surface of an electrode active material layer included in an electrode prepared in Example 3 according to an embodiment.

FIG. 3A shows a scanning electron microscope image of the surface of the cathode prepared in Example 3. The circled part is a first domain including a first cluster.

Figure 3B:
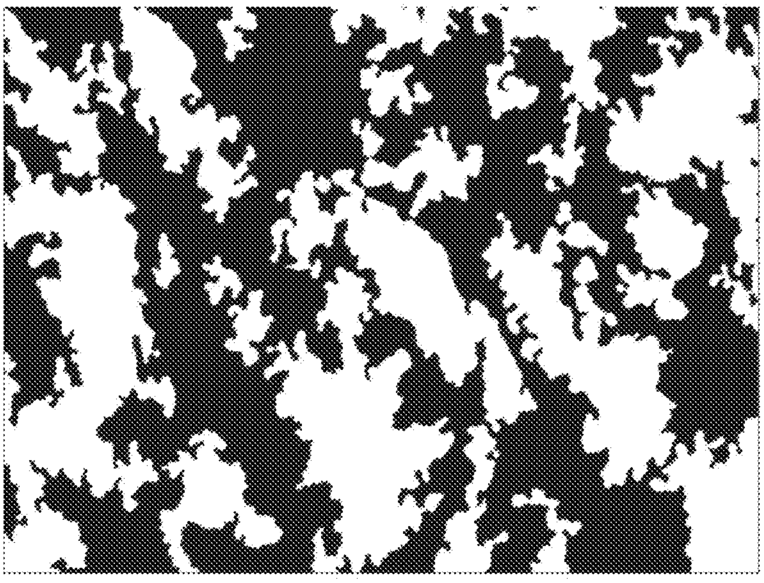
FIG. 3B shows an image obtained by converting the scanning electron microscope image of FIG. 3A through image analysis according to an embodiment.

FIG. 3B shows an image obtained by image analysis on the scanning electron microscope image of FIG. 3A, in the image is divided into a first domain including a first cluster and a second domain including a second cluster. The first domain is white, and the second domain is black.

However, from among a plurality of clusters included in the white domain, an agglomerate having an area of less than 2500 $\mu m^2$ was considered not to form a first cluster including four or more primary particles, and was excluded from the calculation of the area of the first domain.

As shown in FIGS. 3A and 3B, the area of the first domain including the first cluster with respect to the total area of the surface of the cathode active material layer was 37.1%.

Example 4: Dry Cathode, Bimodal Cathode Active Material, 8:2 of Weight Ratio of Greater Particle Diameter Cathode Active Material to Smaller Particle Diameter Cathode Active Material, Mixture Density of 3.0 g/$cm^3$ A cathode and a lithium battery were manufactured in substantially the same manner as in Example 1, except that the weight ratio of $LiNi_{0.91}Co_{0.05}Al_{0.04}O_2$ (hereinafter, referred to as a greater particle diameter NCA91) having a greater particle diameter of average particle diameter (D50) 18 μm, which is a first cathode active material, $LiNi_{0.91}Co_{0.05}Al_{0.04}O_2$ (hereinafter referred to as a smaller particle diameter NCA91) having a smaller particle diameter of average particle diameter (D50) 3 which is a second cathode active material, a carbon conductive material (Denka Black), which is a dry conductive material, and polytetrafluoroethylene (PTFE), which is dry binder, was changed to be 76.8:19.2:1.8:2.2, and the mixture density of the cathode active material layer was changed to be 3.0 g/$cm^3$.

The area of the first domain including the first cluster was 47.2% of the total area of the cathode active material layer surface.

Comparative Example 1: Wet Cathode, Bimodal Cathode Active Material, Mixture Density of 3.6 g/$cm^3$ (Manufacture of Cathode)

A cathode and a lithium battery were manufactured in substantially the same manner as in Example 1, except that the mixture obtained by mixing $LiNi_{0.91}Co_{0.05}Al_{0.04}O_2$ (hereinafter, referred to as a greater particle diameter NCA91) having a greater particle diameter of average particle diameter (D50) 18 μm, which is a first cathode active material, $LiNi_{0.91}Co_{0.05}Al_{0.04}O_2$ (hereinafter referred to as a smaller particle diameter NCA91) having a smaller particle diameter of average particle diameter (D50) 3 μm, which is a second cathode active material, a carbon conductive material (Denka Black), and polyvinylidene fluoride (PVdF) in the weight ratio of 67.2:28.8:1.8:2.2, was mixed together with N-methylpyrrolidone (NMP) in an agate mortar to prepare a slurry.

The slurry was bar-coated on one side of an aluminum current collector having a thickness of 15 μm, dried at room temperature, and dried again under vacuum and 120° C. to introduce a cathode active material layer to prepare a laminate.

The prepared laminate was roll-pressed to prepare a cathode. The mixture density of the cathode active material layer was 3.6 $g/cm^3$. The thickness of the cathode active material layer was 100 μm.

The area of the first domain including the first cluster was 7.8% of the total area of the cathode active material layer surface.

Figure 4:
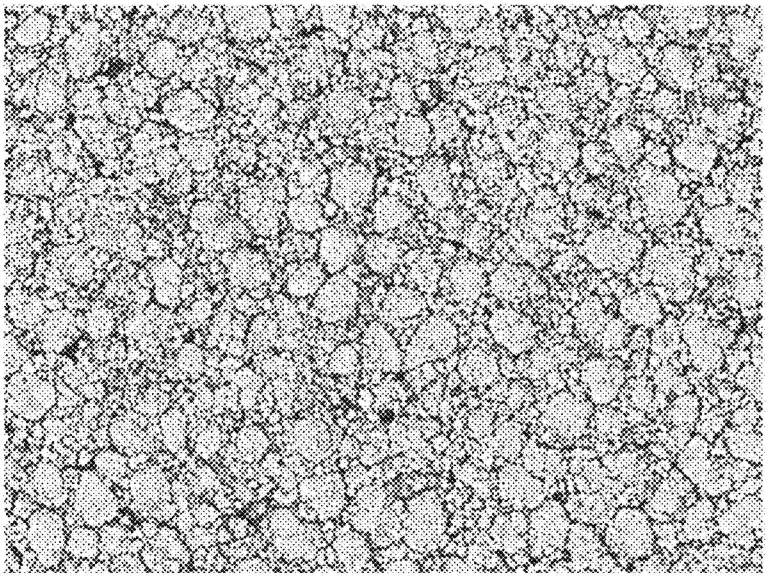
FIG. 4 shows a scanning electron microscope image of the surface of the cathode prepared in Comparative Example 1.

FIG. 4 shows a scanning electron microscope image of the surface of the cathode prepared in Comparative Example 1.

The first cathode active material was homogeneously distributed on the surface of the cathode active material layer, and the second cathode active material and the binder were disposed between the first cathode active material, so that clusters of the first cathode active material were hardly observed.

(Manufacture of Coin Cells)

A coin cell was manufactured in substantially the same manner as in Example 1, except that the cathode prepared above was utilized.

Comparative Example 2: Dry Cathode, Greater Particle Diameter Monomodal Cathode Active Material, Mixture Density of 3.6 $g/cm^3$ A cathode and a lithium battery were manufactured in substantially the same manner as in Example 1, except that as the cathode active material, only greater particle diameter $LiNi_{0.91}Co_{0.05}Al_{0.04}O_2$ (hereinafter referred to as greater particle diameter NCA91) of an average particle diameter (D50) 18 μm, was utilized, and the smaller particle diameter cathode active material was excluded.

The area of the first domain including the first cluster was 90.2% of the total area of the cathode active material layer surface.

Because the first cathode active material was utilized, most of the first cathode active material constituted a cluster.

Comparative Example 3: Dry Cathode, Smaller Particle Diameter Monomodal Cathode Active Material, Mixture Density of 3.6 $g/cm^3$ A cathode and a lithium battery were manufactured in substantially the same manner as in Example 1, except that as the cathode active material, only smaller particle diameter $LiNi_{0.91}Co_{0.05}Al_{0.04}O_2$ (hereinafter referred to as smaller particle diameter NCA91) of an average particle diameter (D50) 3 μm, was utilized, and the greater particle diameter cathode active material was excluded.

The area of the first domain including the first cluster was 0.9% of the total area of the cathode active material layer surface.

Because the second cathode active material was utilized, the second cathode active material did not substantially form a cluster.

Comparative Example 4: Dry Cathode, Bimodal Cathode Active Material

A cathode and A lithium battery were manufactured in substantially the same manner as in Example 1, except that the second mixture was put in a mortar mill and further processed at a speed of 100 rpm for 5 minutes, then put into an extruder and extruded to prepare a sheet-shaped cathode active material layer self-standing film (self-standing film).

The area of the first domain including the first cluster was 8.9% of the total area of the cathode active material layer surface.

Comparative Example 5: Dry Cathode, Bimodal Cathode Active Material

A cathode and a lithium battery were manufactured in substantially the same manner as in Example 1, except that the second mixture was further processed at 12000 rpm in a centrifugal mill for 3 minutes, passed through a 200 μm sieve, and put into an extruder and extruded to prepare a sheet-shaped cathode active material layer self-standing film.

The area of the first domain including the first cluster was 68% of the total area of the cathode active material layer surface.

Reference Example 1: Dry Cathode, Free of Coating Layer

A dry cathode was manufactured in substantially the same manner as in Example 1, except that an aluminum thin film with a thickness of 10 μm, which was not coated with a carbon layer, was utilized as a cathode current collector.

Because a part of the cathode active material layer was peeled off from the cathode current collector in the manufactured cathode, it was impossible to manufacture a coin cell.

Evaluation Example 1: Evaluation of Vertical Force of Cathode Active Material Layer (I)

The binding characteristics of the cathode active material layer included in the cathodes prepared in Example 1 and Comparative Example 1 were analyzed utilizing SAICAS (SAICAS EN-EX, Daipla Wintes, JAPAN).

The vertical force (Fv) according to the depth was measured by performing a constant velocity analysis utilizing a diamond blade having the width of 1 mm at the clearance angle of 10°, at the rake angle of 20°, at the shear angle of 45°, at the horizontal velocity of 4 μm/s, and at the vertical velocity of 0.4 μm/s.

First, a first constant velocity analysis was performed from a first position on the surface of the cathode active material layer to the surface of the cathode current collector, and the blade was horizontally moved along the surface of the cathode current collector to remove the cathode active material layer. Then, at a position 10 μm backward from the first position, a second constant velocity analysis was performed under the same conditions as the first constant velocity analysis. The data measured from the second constant velocity analysis were utilized.

With respect to the cathode active material layer, the vertical force of the cathode active material layer was measured, and the measured data was normalized as the binding force graph area to derive the vertical relative force ($F_{VR}$) according to the depth of the cathode active material layer.

For the vertical force of the cathode active material layer, data measured in the section from a first point spaced 5% from the surface of the cathode active material layer to a second point spaced 5% from the surface of the electrode current collector with respect to the total thickness of the cathode active material layer, was utilized. For example, data near the surface of the cathode active material layer and data near the surface of the electrode current collector were excluded to prevent or reduce measurement errors.

From the derived vertical relative force ($F_{VR}$) data of the cathode active material layer, a change rate of vertical relative force ($F_{VR}$) was calculated utilizing Equation 1. In some embodiments, the arithmetic refer to value was calculated from the derived vertical relative force ($F_{VR}$) data of the cathode active material layer.

$$\text{Rate of change in vertical relative force } (F_{VR}) = [(\text{maximum value of vertical relative force} - \text{minimum value of vertical relative force})/\text{minimum value of vertical relative force}] \times 100 \quad \text{< Equation 1 >}$$

As a result of the measurement, the ratio of change of the vertical relative force of the cathode active material layer included in the cathode of Example 1 was 200% or less.

Therefore, it was confirmed that the cathode active material layer had a substantially uniform binding force and composition distribution regardless of the position along the thickness direction.

In contrast, in the cathode active material layer included in the cathode of Comparative Example 1, the change rate of the binding force in the vertical direction was over 1000%.

Therefore, it was confirmed that the cathode active material layer of Comparative Example 1 had a significantly changed binding force and composition distribution depending on the thickness direction.

Evaluation Example 2: Evaluation of the Horizontal Force of the Cathode Active Material Layer (II)

The binding characteristics of the cathode active material layer included in the cathodes prepared in Example 1 and Comparative Example 1 were analyzed utilizing SAICAS (SAICAS EN-EX, Daipla Wintes, JAPAN).

The horizontal force (FH) according to the depth was measured by performing a constant velocity analysis utilizing a diamond blade having the width of 1 mm at the clearance angle of 10°, at the rake angle of 20°, at the shear angle of 45°, at the horizontal velocity of 4 μm/s, and at the vertical velocity of 0.4 μm/s.

First, a first constant velocity analysis was performed from a first position on the surface of the cathode active material layer to the surface of the cathode current collector, and the blade was horizontally moved along the surface of the cathode current collector to remove the cathode active material layer. Then, at a position 10 μm backward from the first position, a second constant velocity analysis was performed under the same conditions as the first constant velocity analysis. The data measured from the second constant velocity analysis were utilized.

With respect to the total thickness of the cathode active material layer, the first horizontal force ($F_{H1}$) at the first point 10% apart from the surface of the cathode active material layer and the second horizontal force ($F_{H2}$) at the second point 10% apart from the surface of the cathode current collector were measured.

The horizontal force ratio of the first point and the second point is defined by Equation 2.

$$\text{Horizontal force ratio of the first point and the second point } (\%) = [F_{H2}/F_{H1}] \times 100 \quad \text{< Equation 2 >}$$

The measurement result shows that the ratio of the horizontal relative force of the cathode active material layer of Example 1 was 70% or more.

In contrast, the horizontal force ratio of the cathode active material layer of Comparative Example 1 was less than 50%.

For example, the ratio of the horizontal relative force of the cathode active material layer of Example 1 was increased compared to that of the cathode active material layer of Comparative Example 1.

Therefore, it was confirmed that the cathode active material layer of Example 1 had a more substantially uniform binding force and composition distribution compared to the cathode active material layer of Comparative Example 1.

Evaluation Example 3: Evaluation of Charge and Discharge Characteristics at Room Temperature Each of the lithium batteries manufactured in Examples 1 to 4 and Comparative Examples 1 to 5 was charged with a constant current of 0.1 C rate at 25° C. until a voltage reached 4.4 V (vs. Li), and was then cut-off at a current of 0.05 C rate while maintaining the voltage at 4.4 V in a constant voltage mode. Subsequently, each of the lithium batteries was discharged at a constant current of 0.1 C rate until the voltage reached 2.8V (vs. Li) (formation cycle).

The lithium battery that had undergone the formation cycle, was charged with a constant current at 25° C. at a rate of 0.5 C until the voltage reached 4.4 V (vs. Li). Then, the lithium battery was discharged at a constant current of 0.5 C rate until the voltage reached 2.8 V (vs. Li) during discharging, and this cycle was repeated under the same conditions up to the $100^{th}$ cycle (repeated 100 times).

In all charge/discharge cycles, a 10-minute stop time was provided after every charge/discharge cycle. Some of the results of the charging and discharging experiments at room temperature are shown in Table 1. The capacity retention rate in the $100^{th}$ cycle is defined by Equation 3.

$$\text{Capacity retention ratio } [\%] = [\text{discharge capacity in } 100^{th} \text{ cycle}/\text{discharge capacity in } 1^{st} \text{ cycle}] \times 100 \quad \text{Equation 3}$$

TABLE 1

| | First domain area [%] | Capacity retention ratio [%] |
|---|---|---|
| Example 1 | 51.4 | 94.6 |
| Example 2 | 57.7 | 93.4 |
| Example 3 | 37.1 | 95.4 |
| Example 4 | 47.2 | 93.5 |
| Comparative Example 1 | 7.8 | 93.3 |
| Comparative Example 2 | 90.2 | 90.4 |
| Comparative Example 3 | 0.9 | 87.8 |
| Comparative Example 4 | 8.9 | 92.8 |
| Comparative Example 5 | 68 | 93.4 |

As shown in Table 1, the lithium batteries of Examples 1 to 4 had improved room-temperature lifespan characteristics compared to the lithium batteries of Comparative Examples 1 to 5.

Evaluation Example 4: Room Temperature High Rate Characteristic Evaluation

Each of the lithium batteries manufactured in Examples 1 to 6 and Comparative Examples 1 to 5 was charged with a constant current of 0.1 C rate at 25° C. until a voltage reached 4.4 V (vs. Li), and was then cut-off at a current of 0.05 C rate while maintaining the voltage at 4.4 V in a constant voltage mode. Subsequently, the lithium battery was discharged at a constant current of 0.1 C rate until the voltage reached 2.8V (vs. Li) (formation cycle).

The lithium battery that had undergone the formation cycle, was charged with a constant current at 25° C. at a rate of 0.2 C until the voltage reached 4.4 V (vs. Li). Subsequently, the lithium battery was discharged at a constant current at a rate of 0.2 C until the voltage reached 2.8V (vs. Li) ($1^{st}$ cycle).

The lithium battery that had undergone the formation cycle, was charged with a constant current at 25° C. at a rate of 0.2 C until the voltage reached 4.4 V (vs. Li). Subsequently, the lithium battery was discharged at a constant current of 0.33 C rate until the voltage reached 2.8 V (vs. Li) ($2^{nd}$ cycle).

The lithium battery that had undergone the formation cycle, was charged with a constant current at 25° C. at a rate of 0.2 C until the voltage reached 4.4 V (vs. Li). Subsequently, the lithium battery was discharged at a constant current of 0.5 C rate until the voltage reached 2.8 V (vs. Li) ($3^{rd}$ cycle).

The lithium battery that had undergone the formation cycle, was charged with a constant current at 25° C. at a rate of 0.2 C until the voltage reached 4.4 V (vs. Li). Subsequently, the lithium battery was discharged at a constant current at a rate of 1.0 C until the voltage reached 2.8 V (vs. Li) ($4^{th}$ cycle).

The lithium battery that had undergone the formation cycle, was charged with a constant current at 25° C. at a rate of 0.2 C until the voltage reached 4.4 V (vs. Li). Subsequently, the lithium battery was discharged at a constant current at a rate of 2.0 C until the voltage reached 2.8 V (vs. Li) ($5^{th}$ cycle).

The lithium battery that had undergone the formation cycle, was charged with a constant current at 25° C. at a rate of 0.2 C until the voltage reached 4.4 V (vs. Li). Subsequently, the lithium battery was discharged at a constant current of 3.0 C rate until the voltage reached 2.8 V (vs. Li) ($6^{th}$ cycle).

In all charge/discharge cycles, a 10-minute stop time was provided after every charge/discharge cycle. Some of the results of the charging and discharging experiments at room temperature are shown in Table 2. The high rate characteristics are defined by Equation 4.

$$\text{High-rate characteristic [\%]} = [\text{discharge capacity in } 5^{th} \text{ cycle/discharge capacity in } 1^{st} \text{ cycle}] \times 100 \quad \text{<Equation 4>}$$

TABLE 2

| | First domain area [%] | High-rate characteristic (2 C/0.2 C) [%] |
|---|---|---|
| Example 1 | 51.4 | 65.2 |
| Example 2 | 57.7 | 67.4 |
| Example 3 | 37.1 | 63.3 |
| Example 4 | 47.2 | 69.4 |
| Comparative Example 1 | 7.8 | 40.2 |
| Comparative Example 2 | 90.2 | 70.1 |
| Comparative Example 3 | 0.9 | 50.2 |
| Comparative Example 4 | 8.9 | 53.8 |
| Comparative Example 5 | 68 | 60.3 |

As shown in Table 2, the lithium batteries of Examples 1 to 4 have improved high-rate characteristics compared to the lithium batteries of Comparative Example 1 and Comparative Example 5.

According to one aspect, the electrolyte impregnation property of an electrode can be improved by including a first cluster, which is an agglomerate of the first electrode active material in the electrode.

Because the electrode has a substantially uniform distribution of components, the high-rate characteristic of a lithium battery utilizing such an electrode is improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that one or more suitable changes in form and details may be made therein without departing from the spirit and scope of the disclosure as defined by the following claims and equivalents thereof.

As used herein, the term "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the terms "use," "using," and "used" may be considered synonymous with the terms "utilize," "utilizing," and "utilized," respectively.

The use of "may" when describing embodiments of the present disclosure refers to "one or more embodiments of the present disclosure."

As used herein, the singular forms "a", "an" and "the" are intended to include the plural forms as well, unless the context clearly indicates otherwise.

In the present disclosure, when particles are spherical, "size" or "diameter" indicates an average particle diameter, and when the particles are non-spherical, the "size" or "diameter" indicates a major axis length. That is, when particles are spherical, "diameter" indicates a particle diameter or an average particle diameter, and when the particles are non-spherical, the "diameter" indicates a major axis length or an average major axis length. The size or diameter of the particles may be measured utilizing a scanning electron microscope or a particle size analyzer. As the particle size analyzer, for example, HORIBA, LA-950 laser particle size analyzer, may be utilized. When the size of the particles is measured utilizing a particle size analyzer, the average particle diameter (or size) is referred to as D50. D50 refers to the average diameter (or size) of particles whose cumulative volume corresponds to 50 vol % in the particle size distribution (e.g., cumulative distribution), and refers to the value of the particle size corresponding to 50% from the smallest particle when the total number of particles is 100% in the distribution curve accumulated in the order of the smallest particle size to the largest particle size.

As used herein, expressions such as "at least one of", "one of", and "selected from", when preceding a list of elements, modify the entire list of elements and do not modify the individual elements of the list. For example, "at least one of a, b or c", "at least one selected from a, b and c", etc., may indicate only a, only b, only c, both (e.g., simultaneously) a and b, both (e.g., simultaneously) a and c, both (e.g., simultaneously) b and c, all of a, b, and c, or variations thereof.

The vehicle, a battery management system (BMS) device, and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the present disclosure.

What is claimed is:

1. An electrode comprising:

an electrode current collector; and an electrode active material layer on a surface of the electrode current collector, wherein the electrode active material layer comprises a first electrode active material, a second electrode active material, and a binder, the electrode active material layer comprises a first cluster, wherein the first cluster is an agglomerate comprising a plurality of first electrode active materials, a surface of the electrode active material layer comprises a first domain comprising the first cluster, and an area of the first domain is about 15% to about 60% of a total area of the surface of the electrode active material layer, wherein the surface of the electrode active material layer further comprises a second domain comprising a second cluster, the second cluster is an agglomerate comprising a plurality of second electrode active materials and a binder, wherein the electrode comprises a primary domain and a secondary domain in a plan view, wherein the electrode current collector overlaps the primary domain and does not overlap the secondary domain in the plan view, and wherein, in the primary domain, the electrode current collector is disposed between opposite surfaces of the electrode active material layer and, in the secondary domain, the electrode current collector is not disposed between opposite surfaces of the electrode active material layer.

2. The electrode of claim 1, wherein a number of the plurality of first electrode active materials constituting the first cluster is 4 to 200.

3. The electrode of claim 1, wherein an area occupied by a first cluster on the surface of the electrode active material layer is about 2500 $\mu m^2$ or more.

4. The electrode of claim 1, wherein the first electrode active material is greater in electrode active material particle diameter than that of the second electrode active material, and the second electrode active material is smaller in electrode active material particle diameter than that of the first electrode active material.

5. The electrode of claim 1, wherein each of the first electrode active material and the second electrode active material has a bimodal particle diameter distribution in a particle size distribution diagram thereof.

6. The electrode of claim 1, wherein a particle diameter ratio of the first electrode active material to the second electrode active material is about 3:1 to about 40:1.

7. The electrode of claim 1, wherein a particle diameter of the first electrode active material is about 15 μm to about 30 μm, and a particle diameter of the second electrode active material is about 1 μm to about 6 μm.

8. The electrode of claim 1, wherein a weight ratio of the first electrode active material to the second electrode active material is about 90:10 to about 60:40.

9. The electrode of claim 1, wherein the binder is a dry binder, the dry binder comprises a fibrillized binder, and the dry binder comprises a fluorine-based binder.

10. The electrode of claim 1, wherein the electrode active material layer further comprises a conductive material, the conductive material is a dry conductive material, and the dry conductive material comprises a carbonaceous conductive material.

11. The electrode of claim 1, wherein the electrode active material layer is a self-standing film, and the electrode active material layer does not contain any residual processing solvent.

12. The electrode of claim 1, wherein the electrode current collector comprises a base film and a metal layer disposed on one or both sides of the base film, the base film comprises a polymer, and the polymer comprises polyethylene terephthalate (PET), polyethylene (PE), polypropylene (PP), polybutylene terephthalate (PBT), polyimide (PI), or a combination thereof, and the metal layer comprises indium (In), copper (Cu), magnesium (Mg), stainless steel, titanium (Ti), iron (Fe), cobalt (Co), nickel (Ni), zinc (Zn), aluminum (Al), Germanium (Ge), lithium (Li), or an alloy thereof.

13. The electrode of claim 1, further comprising a coating layer on the surface of the electrode current collector, and a thickness of the coating layer is about 30% or less of the electrode current collector thickness, wherein the coating layer comprises a binder, the binder comprises at least one selected from a conductive binder and a non-conductive binder, and the binder comprises a fluorine-based binder.

14. The electrode of claim 13, wherein the coating layer further comprises a carbonaceous conductive material.

15. The electrode of claim 1, wherein, with respect to an entire thickness of the electrode active material layer, a ratio of change in a vertical relative force ($F_{VR}$) according to a depth from a first point spaced about 5% from the surface of the electrode active material layer in a direction from the surface of the electrode active material layer to the electrode current collector to a second point spaced about 5% apart from the surface of the electrode current collector in a direction from the surface of the electrode current collector to the electrode active material layer is about 300% or less.

16. The electrode of claim 1, wherein, with respect to an entire thickness of the electrode active material layer, a horizontal force ratio of a second horizontal force ($F_{H2}$) at a second point spaced about 10% apart from the surface of the electrode current collector in a direction from the surface of the electrode current collector to the electrode active material layer to a first horizontal force ($F_{H1}$) at a first point spaced about 10% from the surface of the electrode active material layer in a direction from the surface of the electrode active material layer to the electrode current collector is about 50% or more.

17. A lithium battery comprising:

a cathode;

an anode; and an electrolyte located between the cathode and the anode, wherein at least one of the cathode and the anode is the electrode of claim 1.

18. The lithium battery of claim 17, wherein the electrolyte is a liquid electrolyte or a solid electrolyte.

* * * * *